US011238432B2

(12) United States Patent
Yen et al.

(10) Patent No.: US 11,238,432 B2
(45) Date of Patent: Feb. 1, 2022

(54) METHOD FOR ENABLING A COMMUNICATION LINK BETWEEN A MOBILE TERMINAL AND A RECEIVING TERMINAL

(71) Applicant: MASTERCARD ASIA PACIFIC PTE LTD., Singapore (SG)

(72) Inventors: Philip Wei Ping Yen, Singapore (SG); Harjender Singh, Singapore (SG); Michihiko Yoden, Singapore (SG); Syam Sasidharan Nair, Singapore (SG); Pei Ling Lee, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 1482 days.

(21) Appl. No.: 15/050,575

(22) Filed: Feb. 23, 2016

(65) Prior Publication Data

US 2016/0260085 A1    Sep. 8, 2016

(30) Foreign Application Priority Data

Mar. 3, 2015    (SG) ........................ 10201501607W
Aug. 21, 2015  (SG) ........................ 10201506662X

(51) Int. Cl.
*G06Q 20/32*    (2012.01)
*H04W 76/11*   (2018.01)
(Continued)

(52) U.S. Cl.
CPC ....... *G06Q 20/3274* (2013.01); *G06Q 20/327* (2013.01); *G06Q 20/3276* (2013.01);
(Continued)

(58) Field of Classification Search
None
See application file for complete search history.

(56) References Cited

U.S. PATENT DOCUMENTS 5,649,102 A * 7/1997 Yamauchi ................ G06F 9/52
                                                    709/213
7,072,672 B1 * 7/2006 Vanska ................. H04L 67/34
                                                    455/456.3
(Continued)

FOREIGN PATENT DOCUMENTS

EP     1 149 367 A1    10/2001
WO    00/46768 A1      8/2000

OTHER PUBLICATIONS

Tao-Ku Chang (A Secure Cloud-based Payment Model for M-Commerce) (Year: 2013).*
(Continued)

*Primary Examiner* — Mamon Obeid
(74) *Attorney, Agent, or Firm* — Buchanan Ingersoll & Rooney PC

(57) ABSTRACT

According to a first aspect, there is provided a method for enabling a communication link over which transaction data is transmitted between a mobile terminal and a receiving terminal, the method comprising: storing in a memory at the mobile terminal, the receiving terminal and a server administering the communication link, a generated unique identifier, the unique identifier used to facilitate the enablement of the communication link; creating a storage slot at the server administering the communication link, the storage slot being assigned the unique identifier and the storage slot used to store the transaction data; and enabling the communication link in response to the creation of the storage slot, wherein the communication link is utilised by both the mobile terminal and the receiving terminal by referencing the unique identifier to the server.

23 Claims, 19 Drawing Sheets

(51) Int. Cl.
*H04W 4/80* (2018.01)
*H04W 12/50* (2021.01)
*G06Q 20/38* (2012.01)
*G06Q 20/40* (2012.01)
*G06Q 20/42* (2012.01)
*H04W 12/06* (2021.01)
*H04W 12/77* (2021.01)

(52) U.S. Cl.
CPC ..... *G06Q 20/3278* (2013.01); *G06Q 20/3829* (2013.01); *G06Q 20/401* (2013.01); *G06Q 20/42* (2013.01); *H04W 4/80* (2018.02); *H04W 12/06* (2013.01); *H04W 12/50* (2021.01); *H04W 76/11* (2018.02); *G06Q 2220/00* (2013.01); *H04L 2463/102* (2013.01); *H04W 12/77* (2021.01)

(56) References Cited

U.S. PATENT DOCUMENTS

| | | | | |
|---|---|---|---|---|
| 7,603,529 B1* | 10/2009 | MacHardy | ............ | G06F 3/0608 707/999.202 |
| 8,356,754 B2* | 1/2013 | Johnson | ............... | G06Q 20/206 235/472.01 |
| 8,566,596 B2* | 10/2013 | Stephenson | ........ | G06Q 30/0241 713/176 |
| 8,897,746 B1* | 11/2014 | Tarantino | ............. | H04M 17/02 455/406 |
| 9,716,753 B2* | 7/2017 | Piyush | ............... | H04L 67/1095 |
| 2004/0039721 A1* | 2/2004 | Tsuchiya | ................ | G06F 16/10 |
| 2004/0186971 A1* | 9/2004 | Meharchand | ........ | G06F 12/145 711/163 |
| 2005/0127167 A1* | 6/2005 | Nakajima | .......... | G06Q 20/4012 235/380 |
| 2005/0154784 A1* | 7/2005 | Malcolm | ............... | H04L 69/329 709/213 |
| 2005/0238149 A1* | 10/2005 | De Leon | ................ | G06Q 20/32 379/93.12 |
| 2006/0041746 A1* | 2/2006 | Kirkup | .................... | G06F 21/35 713/168 |
| 2006/0178949 A1* | 8/2006 | McGrath | ................ | G06Q 50/26 705/26.1 |
| 2007/0088952 A1* | 4/2007 | Hewitt | ................ | H04L 63/0807 713/171 |
| 2009/0065571 A1* | 3/2009 | Jain | .................... | G06Q 20/3227 235/379 |
| 2009/0228965 A1* | 9/2009 | Klippgen | ................ | H04L 63/18 726/6 |
| 2010/0223146 A1* | 9/2010 | Entenmann | ........ | G06Q 20/3223 705/17 |
| 2012/0012653 A1* | 1/2012 | Johnson | ................ | G07F 7/0886 235/380 |
| 2012/0284637 A1* | 11/2012 | Boyer | .................. | G06Q 10/109 715/751 |
| 2012/0303435 A1* | 11/2012 | Rawat | .................... | G06Q 50/01 705/14.27 |
| 2012/0310979 A1* | 12/2012 | Apthorp | .................. | G06F 16/93 707/770 |
| 2013/0086640 A1* | 4/2013 | Hashimoto | ............ | G06Q 10/10 726/4 |
| 2013/0097248 A1* | 4/2013 | Chakra | ................ | G06Q 10/107 709/206 |
| 2014/0052627 A1* | 2/2014 | Akashika | ............. | G06Q 20/145 705/40 |
| 2014/0054376 A1* | 2/2014 | Yamaguchi | ............ | G06Q 30/06 235/380 |
| 2014/0089662 A1* | 3/2014 | Huang | .................. | H04W 12/06 713/165 |
| 2014/0208384 A1* | 7/2014 | Youssefian | .......... | H04L 63/0869 726/3 |
| 2015/0052064 A1* | 2/2015 | Karpenko | .......... | G06Q 20/3278 705/71 |
| 2016/0260085 A1* | 9/2016 | Yen | ..................... | G06Q 20/3829 |
| 2016/0260117 A1* | 9/2016 | Yen | ......................... | H04W 4/60 |
| 2017/0053272 A1* | 2/2017 | Singh | ................... | G06Q 20/327 |
| 2017/0213206 A1* | 7/2017 | Shearer | ................ | G06Q 20/401 |

OTHER PUBLICATIONS

Notification of Transmittal of the International Search Report and the Written Opinion of the International Searching Authority (Forms PCT/ISA/220, PCT/ISA/210 and PCT/ISA/237) dated May 17, 2016, by the Japanese Patent Office in corresponding International Application No. PCT/SG2016/050078. (9 pages).

* cited by examiner

METHOD FOR ENABLING A COMMUNICATION LINK BETWEEN A MOBILE TERMINAL AND A RECEIVING TERMINAL

FIELD OF INVENTION

The present invention relates broadly, but not exclusively, to a method for enabling a communication link between a mobile terminal and a receiving terminal.

BACKGROUND

The capabilities of smart phones, or mobile phones with an advanced mobile operating system, are increasingly being tapped by merchants to sell their goods or services or both. Smart phones (or hereafter referred to as "mobile terminals") are useful to merchants because such mobile terminals are able to host applications ("mobile applications") that allow for electronic payment of goods and/or services, through the use of digital wallet technology; as well as being able to support value added services, which include coupon or offers and loyalty programs. Examples of a coupon or offer is a ticket or document that can be exchanged for a financial discount or rebate when purchasing a product and/or service while a loyalty program are structured marketing efforts that reward, and therefore encourage, loyal buying behaviour from the same merchant.

While mobile applications are able to facilitate a more frictionless shopping experience, by for example replacing the traditional method of carrying a credit card to make the purchase, a separate loyalty card to keep track of points earned from a purchase or physical vouchers to redeem discounts on a purchase, one problem with their adoption is their compatibility with merchant in-store systems. Each mobile application may use a standard that is compatible with a particular merchant, but may not be compatible with that used by another merchant. Even mobile applications that are designed for communication with the same merchant may not use the same standard.

There is thus a need to implement standards and solutions that enable more merchants to accept in-store transactions (both digital payment and value added service redemption) performed by mobile applications by establishing an open-loop modularized architecture.

SUMMARY

According to a first aspect of the present invention, there is provided a method for enabling a communication link over which transaction data is transmitted between a mobile terminal and a receiving terminal, the method comprising: storing in a memory at the mobile terminal, the receiving terminal and a server administering the communication link, a generated unique identifier, the unique identifier used to facilitate the enablement of the communication link; creating a storage slot at the server administering the communication link, the storage slot being assigned the unique identifier and the storage slot used to store the transaction data; and enabling the communication link in response to the creation of the storage slot, wherein the communication link is utilised by both the mobile terminal and the receiving terminal by referencing the unique identifier to the server.

According to a second aspect of the present invention, there is provided a server for enabling a communication link over which transaction data is transmitted between a mobile terminal and a receiving terminal the server comprising: at least one processor; and at least one memory including computer program code; the at least one memory and the computer program code configured to, with the at least one processor, cause the server at least to: store a generated unique identifier used to facilitate the enablement of the communication link; create a storage slot for administering the communication link, the storage slot being assigned the unique identifier and the storage slot used to store the transaction data and the unique identifier; and enable the communication link to be utilised to transmit the transaction data between the mobile terminal and the receiving terminal in response to either of the mobile terminal or the receiving terminal referencing the unique identifier to the server.

According to a third aspect of the present invention, there is provided a receiving terminal configured to utilise a communication link, administered by a server, over which transaction data is transmitted between a mobile terminal and the receiving terminal, the receiving terminal comprising: at least one processor; and at least one memory including computer program code; the at least one memory and the computer program code configured to, with the at least one processor, cause the receiving terminal at least to: store a generated unique identifier used to facilitate the enablement of the communication link; detect, using the unique identifier, for the presence of a storage slot at the server administering the communication link, the storage slot being assigned the unique identifier and the storage slot used to store the transaction data; and access the communication link to transmit the transaction data between the mobile terminal and the receiving terminal by referencing the unique identifier to the server.

According to a fourth aspect of the present invention, there is provided a non-transitory computer readable medium having stored thereon executable instructions for controlling a server to perform steps comprising storing a generated unique identifier used to facilitate the enablement of a communication link over which transaction data is transmitted between a mobile terminal and a receiving terminal; creating a storage slot at the server; assigning the unique identifier to the storage slot; configuring the storage slot to store the transaction data; and enabling the communication link to be utilizable to transmit the transaction data between the mobile terminal and the receiving terminal in response to either of the mobile terminal or the receiving terminal referencing the unique identifier to the server.

According to a fifth aspect of the present invention, there is provided a non-transitory computer readable medium having stored thereon executable instructions for controlling a receiving terminal to perform steps comprising storing a generated unique identifier used to facilitate the enablement of a communication link over which transaction data is transmitted between a mobile terminal and the receiving terminal; detecting, using the unique identifier, for the presence of a storage slot at a server administering the communication link, the storage slot being assigned the unique identifier and the storage slot used to store the transaction data; and accessing the communication link to transmit the transaction data between the mobile terminal and the receiving terminal by referencing the unique identifier to the server.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
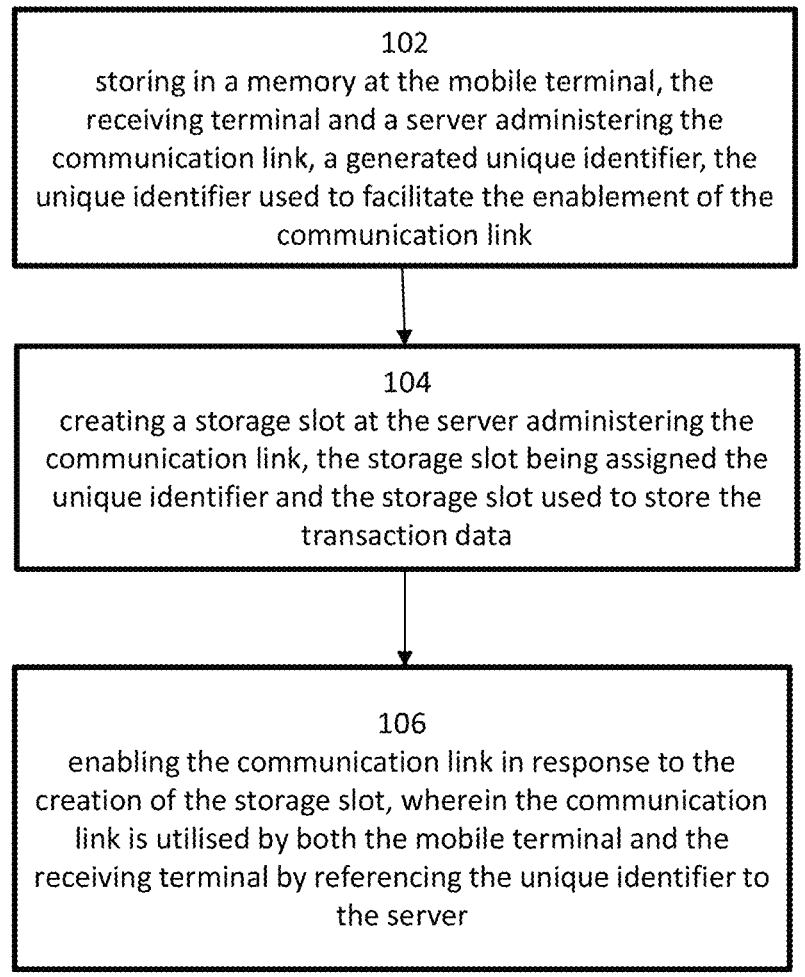
FIG. 1 shows a method, in accordance with one embodiment of the invention, for enabling a communication link over which transaction data is transmitted between a mobile terminal and a receiving terminal.

Embodiments of the present invention will be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a computer or other device selectively activated or reconfigured by a computer program stored in the computer. The algorithms and displays presented herein are not inherently related to any particular computer or other apparatus. Various machines may be used with programs in accordance with the teachings herein. Alternatively, the construction of more specialized apparatus to perform the required method steps may be appropriate. The structure of a conventional computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a computer. The computer readable medium may also include a hard-wired medium such as exemplified in the Internet system, or wireless medium such as exemplified in the GSM mobile telephone system. The computer program when loaded and executed on such a general-purpose computer effectively results in an apparatus that implements the steps of the preferred method.

FIG. 1 shows a method 100, in accordance with one embodiment of the invention, for enabling a communication link over which transaction data is transmitted between a mobile terminal and a receiving terminal. The communication link is administered by a server.

The mobile terminal may be a smart phone with an advanced mobile operating system, such as iOS of Apple Inc. or Android of Google Inc. The operating system hosts one or more applications, where one or more of these applications are used to enable the communication link of the method 100. The receiving terminal may be either a payment terminal or a POS (point of sale) terminal. The payment terminal is a device that is typically used to interface with payment cards, such as credit and debit cards. The payment terminal may also include a NFC (Near Field Communication) transceiver that receives and transmits data from and to the mobile terminal so as to cater for payment, for example through the use of a digital wallet which stores one or more credit or debit cards in electronic form. The NFC transceiver may also be used not only to facilitate such digital wallet payment, but also receive data used in a value added service transaction initiated by the mobile terminal, wherein such data is typically sent to the POS terminal for further processing. Therefore, the payment terminal may be a standalone device or may be connected to the POS terminal. The POS terminal is a system that may include a computer, a cash register and other equipment that supports functions like inventory management and integration with a merchant backend system. The transaction data refers to data generated during a transaction for purchase of goods and/or services, wherein the transaction is typically initiated by use of the mobile terminal to purchase selected goods and/or services.

The method 100 comprises the steps 102, 104 and 106 which are explained in further detail below.

In the step 102, a generated unique identifier is stored in a memory at the mobile terminal, the receiving terminal and the server administering the communication link. The unique identifier is used to facilitate the enablement of the communication link. The unique identifier may be generated by any one of the mobile terminal, the receiving terminal and the server, wherein the generated unique identifier is then received by the other two of the mobile terminal, the receiving terminal and the server for storage in their respective memory. In a preferred embodiment, the one of the mobile terminal, the receiving terminal and the server that generates the unique identifier will then transmit the generated unique identifier to one of the other two of the mobile terminal, the receiving terminal and the server, which will in turn transmit the received unique identifier to the remaining one of the mobile terminal, the receiving terminal and the server. In this manner, all of the mobile terminal, the receiving terminal and the server receive the unique identifier used to facilitate the enablement of the communication link. For example, the mobile terminal may generate the unique identifier and transmit the unique identifier to the receiving terminal, whereby the server receives the unique identifier from the receiving terminal during the creation of a storage slot, the storage slot being described in further detail in step 104. In another example, the receiving terminal may generate the unique identifier and transmit the unique identifier to the mobile terminal, whereby the server receives the unique identifier from the mobile terminal during the creation of the storage slot. In another embodiment, the one of the mobile terminal, the receiving terminal and the server that generates the unique identifier will then transmit the generated unique identifier to both of the other two of the mobile terminal, the receiving terminal and the server. The receipt of the unique identifier by both the mobile terminal and the receiving terminal pairs these two terminals, in that this unique identifier provides a means for both the mobile terminal and the receiving terminal to recognize that either is communicating with the correct terminal and also provides a means to call up transaction data exchanged between the mobile terminal and the receiving terminal. The term "unique identifier" may be used interchangeably with the term "pairing identifier".

In the step 104, a storage slot is created at the server administering the communication link. The term "storage slot" may be used interchangeably with the term "pairing slot". The storage slot is assigned the unique identifier of the step 102, so that this assignment creates the storage slot in that such a storage slot would not be reserved for the communication link without the assignment of the unique identifier. The storage slot may be assigned the unique identifier by the storage slot storing the unique identifier. The storage slot is also used to store the transaction data. The storage slot thus acts as a means to indicate that a channel is allocated for the communication link and provides a repository, in the server, for the transaction data transmitted between the mobile terminal and the receiving terminal. By storing the transaction data in the storage slot, a record of the transaction data is kept and readily accessed by either of the mobile terminal or the receiving terminal. The storage slot may be assigned the unique identifier, so that access to the storage slot may be gained by referencing the unique identifier. In one embodiment, only certain portions of the transaction data are kept in the storage slot, i.e. it is not a necessity of the storage slot to keep a record of all of the transaction data.

In the step 106, the communication link is enabled in response to the creation of the storage slot. The enablement of the communication link establishes a channel for the transaction data to be transmitted between the mobile terminal and the receiving terminal. The communication link is utilised by both the mobile terminal and the receiving terminal by referencing the unique identifier to the server, i.e. when either the mobile terminal or the receiving terminal needs to send transaction data to the other, the channel allocated for the communication link is located through the use of the unique identifier.

The method 100 may not necessarily follow the sequence as shown in FIG. 1. In one approach, the step 104 may be executed after the step 102 is executed. For example, either of the receiving terminal, the mobile terminal or both may store the unique identifier before the storage slot is created at the server. This approach is described in further detail with respect to FIG. 2. In another approach, the step 104 may be executed before the step 102 is executed. For example, either of the mobile terminal, the receiving terminal or both may store the unique identifier after the storage slot is created at the server. This other approach is described in further detail with respect to FIG. 5.

Figure 2:
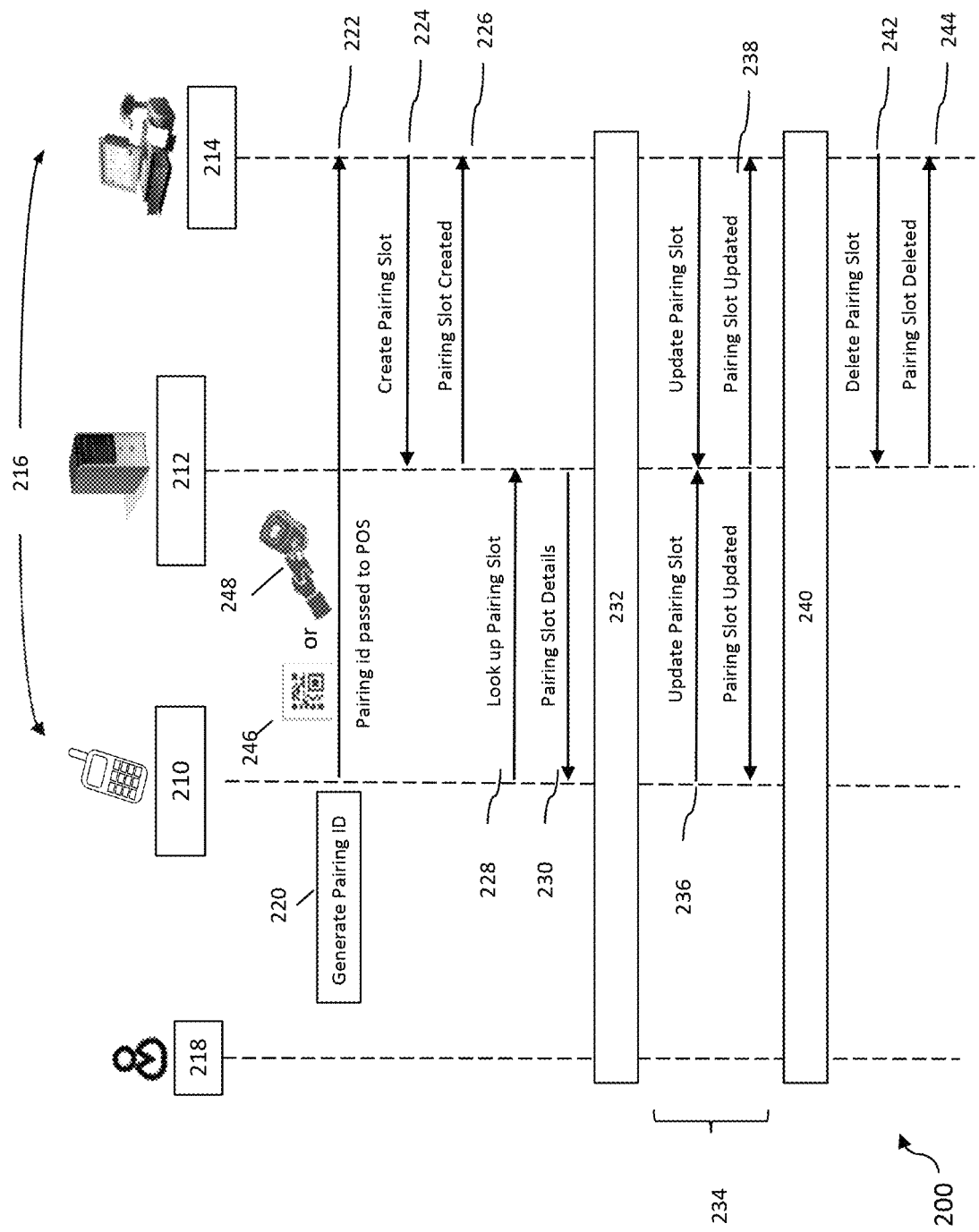
FIG. 2 shows a first implementation of the method of FIG. 1.

FIG. 2 shows the method of FIG. 1 being implemented using a first process flow 200. The process flow 200 is performed by a mobile terminal 210 (operated by a user 218), a receiving terminal 214 and a server 212 that administers a communication link 216 over which transaction data is transmitted between the mobile terminal 210 and the receiving terminal 214.

A unique identifier, used to facilitate the enablement of the communication link 216, is stored in a memory of the mobile terminal 210, the receiving terminal 214 and the server 212 as follows. The mobile terminal 210 stores the unique identifier after the mobile terminal generates 220 the unique identifier. The receiving terminal 214 receives 222 the unique identifier generated by the mobile terminal 210 and stores the generated unique identifier.

The unique identifier may be generated, within the mobile terminal 210, using an application installed in the mobile terminal 210. The application may be initiated by use of the mobile terminal 210 to initiate purchase of goods and/or services, wherein the transaction data, transmitted between the mobile terminal 210 and the receiving terminal 214 through the communication link 216 results from processing the payment of the goods and/or services. The unique identifier may be transmitted 222 from the mobile terminal 210 to the receiving terminal 214 using a NFC protocol 248 or through a QR (Quick Response) code 246 displayed on the mobile terminal 210 and scanned by the receiving terminal 214, wherein the unique identifier is extracted from the QR code 246 scanned into the receiving terminal 214.

A storage slot is then created at the server 212 administering the communication link 216. In the implementation shown in FIG. 2, the storage slot is created by the receiving terminal 214 making an API (application interface) call 224 to the server 212 using the unique identifier. Thus, the storage slot is created in response to being prompted by the receiving terminal 214 after the receiving terminal 214 receives the unique identifier. The storage slot is assigned the unique identifier, for example, by storing the unique identifier. The storage slot is also used to store the transaction data. The server 212 then returns 226 a message to the receiving terminal 214 that the storage slot has been created.

The communication link 216 is enabled in response to the creation of the storage slot. The mobile terminal 210 calls 228 the server 212 to look up the storage slot with the unique identifier. The server 212 then returns 230 a message to the mobile terminal 210 that the storage slot has been created and provides details of the storage slot. The communication link 216 can then be utilised by both the mobile terminal 210 and the receiving terminal 214 by referencing the unique identifier to the server 212, which establishes a communications path 232 over which a transaction 234 can take place, wherein the purchase of the goods and/or services, initiated by the mobile terminal 210, is processed during the transaction 234.

During the transaction 234, each of the mobile terminal 210 and the receiving terminal 214 will send messages to update 236 the storage slot in the server 212 with regard to the transaction data exchanged between the two terminals 210 and 214. The server 212 will reply by returning 238 a message to the mobile terminal 210 and the receiving terminal 214 that its storage slot has been updated.

When the transaction is completed 240, the receiving terminal 214 transmits 242 a request for the storage slot to be deleted. In one implementation, the deletion of the storage slot may occur only after a receipt of the transaction 234 is retrieved from the storage slot in the server 212, which is described in greater detail in FIG. 5. The server 212 will then return 244 a message indicating that the storage slot has been deleted.

The first process flow 200 has the mobile terminal 210, the receiving terminal 214 and the server 212 receive and store the unique identifier, followed by the creation of the storage slot, i.e. the first process flow 200 implements the method 100 of FIG. 1 by having the creation of the storage slot occur after the mobile terminal 210, the receiving terminal 214 and the server 212 receive the unique identifier. However, storage slot creation may occur before the sharing of the unique identifier with the mobile terminal 210, the receiving terminal 214 and the server 212, as described below with respect to FIG. 3.

Figure 3:
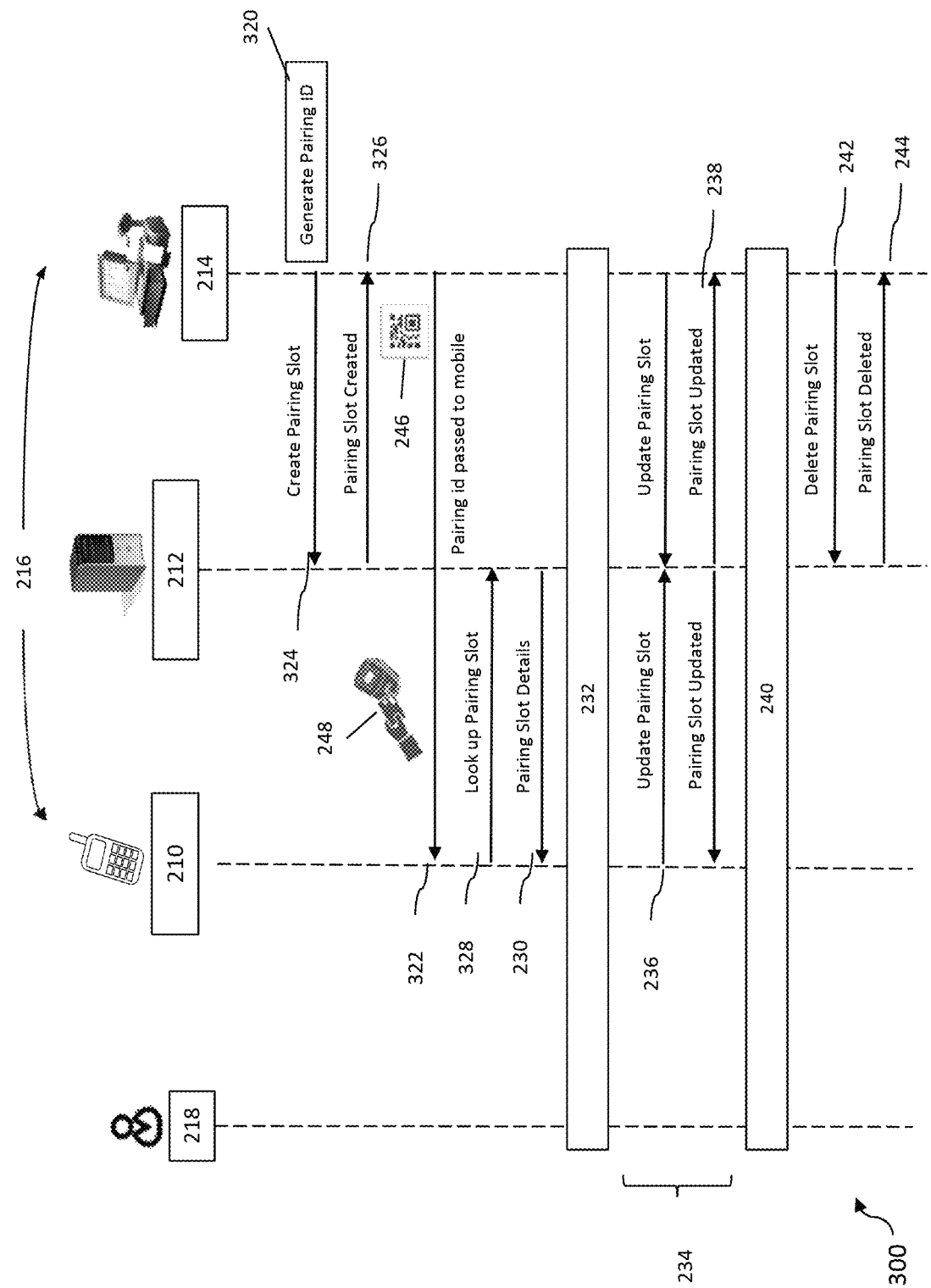
FIG. 3 shows a second implementation of the method of FIG. 1.

FIG. 3 shows the method of FIG. 1 being implemented using a second process flow 300. As in FIG. 2, the second process flow 300 is performed using a mobile terminal 210 (operated by a user 218), a receiving terminal 214 and a server 212 that administers a communication link 216 over which transaction data is transmitted between the mobile terminal 210 and the receiving terminal 214. The differences between the first process flow 200 of FIG. 2 and the second process flow 300 of FIG. 3 are described below.

One difference between the second process flow 300 of FIG. 3 and the first process flow 200 of FIG. 2 is that the receiving terminal 214 generates 320 the unique identifier in FIG. 3, whereas the unique identifier is generated 220 by the mobile terminal 210 in FIG. 2. The receiving terminal 214 stores the unique identifier after the receiving terminal 214 generates 320 the unique identifier. The storage slot is then created using this generated unique identifier by the receiving terminal 214 making an API call 324 to the server 212. The server 212 stores the generated unique identifier into memory and the storage slot is assigned the unique identifier. Therefore, similar to FIG. 2, FIG. 3 has the receiving terminal 214 receiving the unique identifier before the storage slot is created at the server 212. In addition, similar to FIG. 2, the storage slot in FIG. 3 is used to store the transaction data and the unique identifier. The receiving terminal 214 receives 322 the unique identifier generated by the mobile terminal 210 and stores the generated unique identifier. The server 212 then returns 326 a message to the receiving terminal 214 that the storage slot has been created.

Another difference between the second process flow 300 of FIG. 3 and the first process flow 200 of FIG. 2 is that the mobile terminal 210 receives 322 the unique identifier from the receiving terminal 214. In the first process flow 200, the mobile terminal 210 transmits 222 the unique identifier to the receiving terminal 214. In addition, in FIG. 3, the mobile terminal 210 receives the unique identifier after the storage slot is created at the server 212. In contrast, FIG. 2 has the mobile terminal 210 receiving the unique identifier before the storage slot is created at the server 212.

The unique identifier may be transmitted 322 from the receiving terminal 214 to the mobile terminal 210 using a NFC protocol 248 or through a QR code 246 displayed on a display screen of the receiving terminal 214 and scanned by the mobile terminal 210, wherein the unique identifier is extracted from the QR code 246 scanned into the mobile terminal 210. Thus while FIG. 2 uses a forward QR approach to have both the receiving terminal 214 and the mobile terminal 210 receive the unique identifier, FIG. 3 uses a reverse QR approach. In this reverse QR approach, the creation of the storage slot occurs before the mobile terminal 210, the receiving terminal 214 and the server 212 receive and store the unique identifier, wherein the unique identifier is transmitted 322 from the receiving terminal 214 to the mobile terminal 210 using the QR code 246.

After the mobile terminal 210 receives 322 the unique identifier generated by the receiving terminal 214, the mobile terminal 210 calls 328 the server 212, using the received unique identifier, to look up the storage slot created from the API call 224 made to the server 212 by the receiving terminal 214. FIG. 3 thus describes an approach where the unique identifier is generated by the receiving terminal 214, while the mobile terminal 210 and the server 212 both receive the unique identifier from the receiving terminal 214 transmitting the generated unique identifier.

Figure 4:
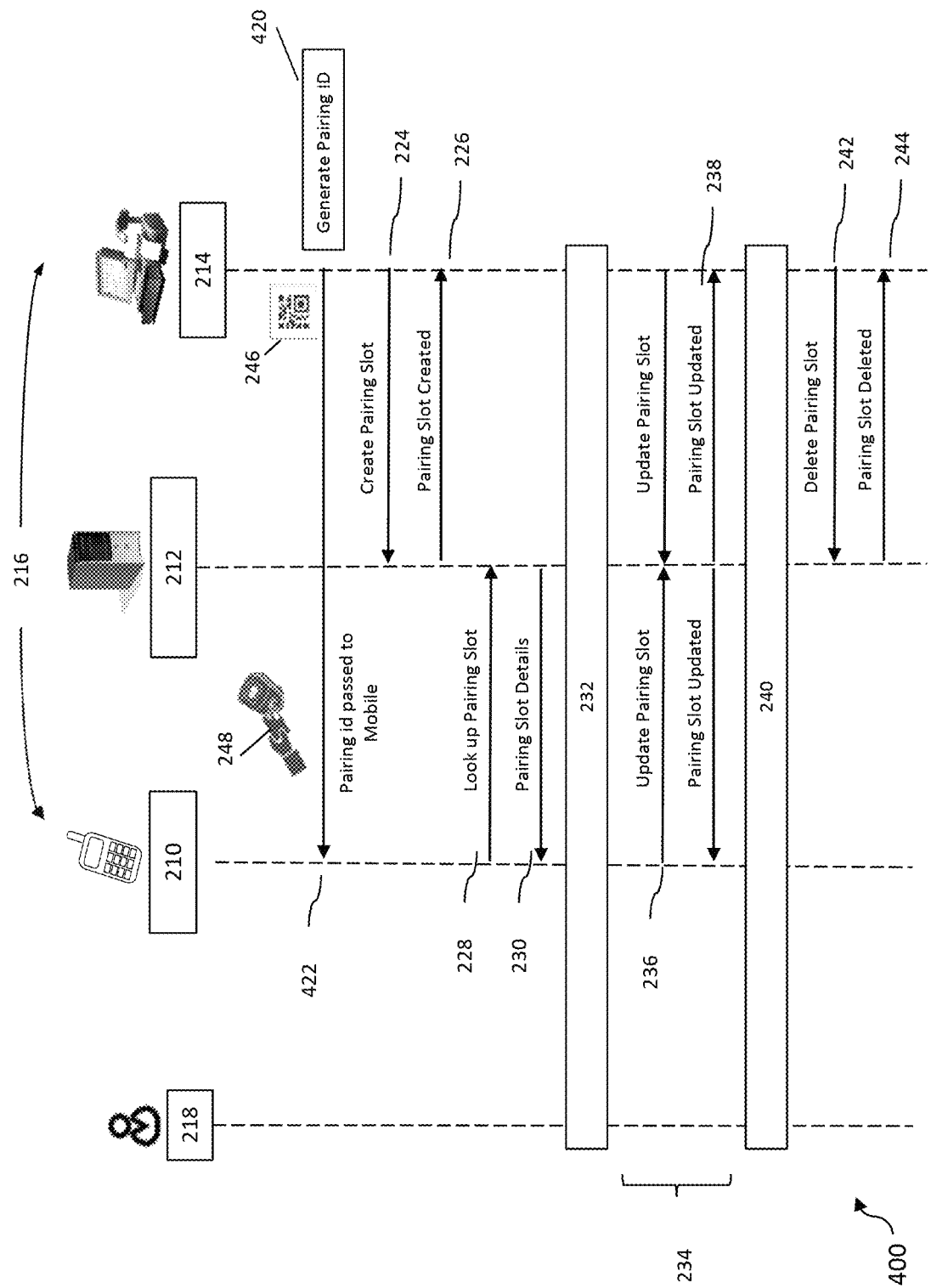
FIG. 4 shows a third implementation of the method of FIG. 1.

FIG. 4 shows the method of FIG. 1 being implemented using a third process flow 400. As in FIGS. 2 and 3, the third process flow 400 is performed using a mobile terminal 210 (operated by a user 218), a receiving terminal 214 and a server 212 that administers a communication link 216 over which transaction data is transmitted between the mobile terminal 210 and the receiving terminal 214. The main difference between the third process flow 400 of FIG. 4 and the first process flow 200 of FIG. 2 is described below.

In the third process flow 400, the receiving terminal 214 stores the unique identifier after the receiving terminal 214 generates 420 the unique identifier. The mobile terminal 210 then receives 422 the unique identifier generated by the receiving terminal 214 and stores the generated unique identifier.

The unique identifier may be transmitted 422 from the receiving terminal 214 to the mobile terminal 210 using a NFC protocol 248 or through a QR code 246 displayed on a display screen of the receiving terminal 214 and scanned by the mobile terminal 210, wherein the unique identifier is extracted from the QR code 246 scanned into the mobile terminal 210. Thus while FIG. 2 uses a forward QR approach to have both the receiving terminal 214 and the mobile terminal 210 receive the unique identifier, FIG. 4 uses a reverse QR approach. In this reverse QR approach, the creation of the storage slot occurs after both the mobile terminal 210 and the receiving terminal 214 receive the unique identifier, wherein the unique identifier is transmitted 422 from the receiving terminal 214 to the mobile terminal 210 using the QR code 246.

As described with reference to FIGS. 2 to 4, the unique identifier is transmitted between the receiving terminal 214 and the mobile terminal 210 using a NFC protocol or a QR code. When the QR code is used, the receiving terminal 214 or the mobile terminal 210 may receive an indication of the utilisation of the communication link 216 to facilitate payment of goods and/or services upon which the transaction data is based, wherein the indication is provided in the QR code. As shown in FIG. 2, the receiving terminal 214 receives the indication from the QR code transmitted by the mobile terminal 214. As shown in FIGS. 3 and 4, the mobile terminal 210 receives the indication from the QR code transmitted by the receiving terminal 214.

The NFC approach described in FIGS. 2 to 4 enables direct bidirectional communication between the mobile terminal 210 and the receiving terminal 214. As such, in the NFC implementation, the communication link 216 is not used to exchange data that facilitates payment of goods and/or services. The storage slot is then used to store transaction data such as data generated during a transaction for purchase of goods and/or services, wherein the generated data comprises any one or more of payment details of the transaction; a receipt of the cost of the transaction and details of the purchased goods and/or services; and data used to facilitate redemption of value added services.

In FIGS. 2 to 4, it is preferable for storage slot creation in the server 212 to occur in response to prompting by the receiving terminal 214. In addition, the generation of the unique identifier required to create the storage slot is in response to the mobile terminal 210 providing an indication of requiring the enablement of the communication link 216. It will be appreciated that the different implementations described in FIGS. 2 to 4, have the commonality of having the mobile terminal 210 and the receiving terminal 214 receive a unique identifier used to facilitate the enablement of the communication link 216; the creation of a storage slot at the server 212 administering the communication link 216, the storage slot being created using the unique identifier and the storage slot used to store the transaction data and the unique identifier; and the enablement of the communication link 216 in response to the creation of the storage slot, wherein the communication link 216 is utilised by both the mobile terminal 210 and the receiving terminal 214 by referencing the unique identifier to the server 212.

Figure 5:
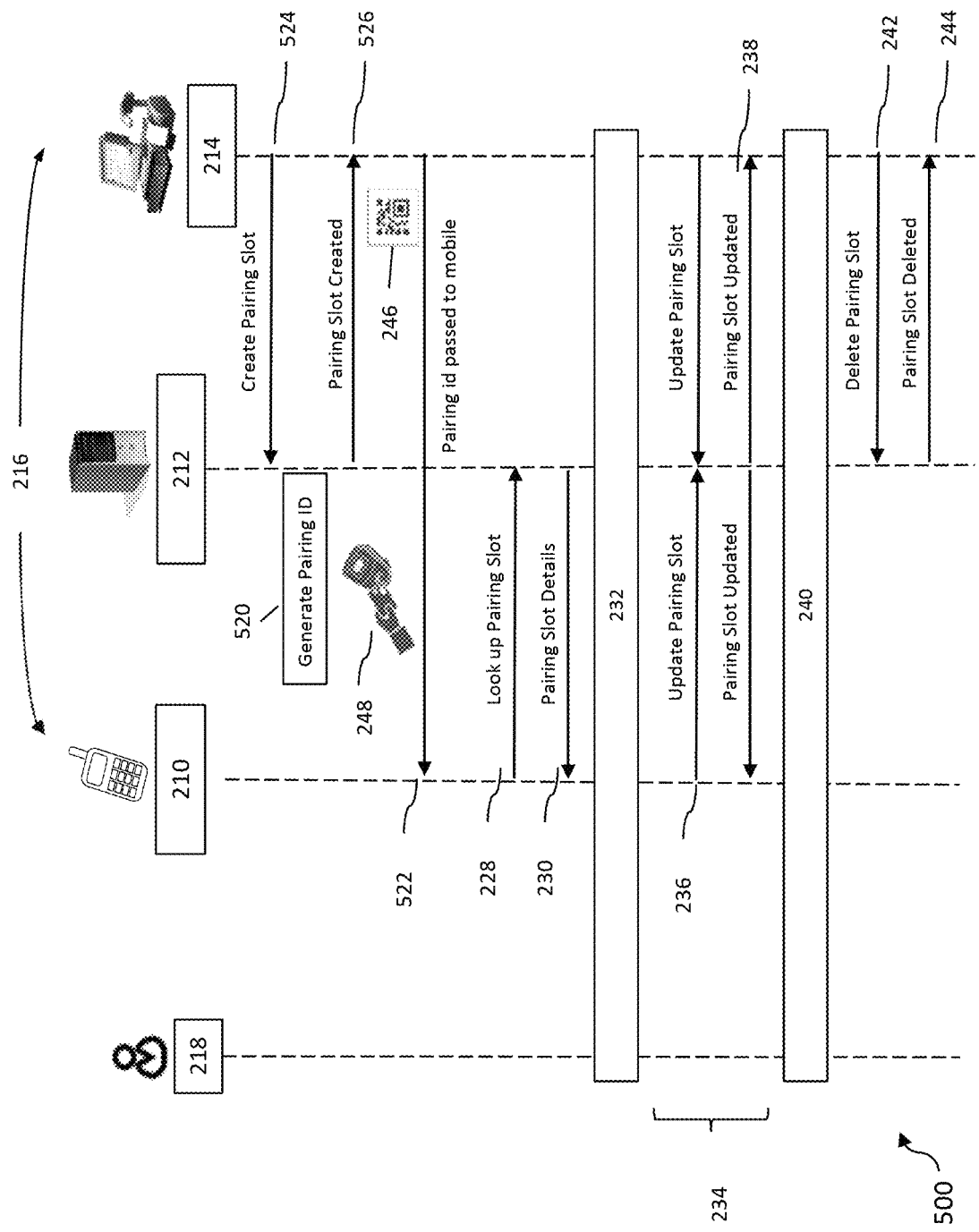
FIG. 5 shows a fourth implementation of the method of FIG. 1.

FIG. 5 shows the method of FIG. 1 being implemented using a fourth process flow 500. As in FIG. 2, the fourth process flow 500 is performed using a mobile terminal 210 (operated by a user 218), a receiving terminal 214 and a server 212 that administers a communication link 216 over which transaction data is transmitted between the mobile terminal 210 and the receiving terminal 214. The differences between the first process flow 200 of FIG. 2 and the fourth process flow 500 of FIG. 5 are described below.

One difference between the fourth process flow 500 of FIG. 5 and the first process flow 200 of FIG. 2 is that the server 212 generates 520 the unique identifier, whereas the mobile terminal 210 generates the unique identifier in FIG. 2. The unique identifier is generated 520 from the receiving terminal 214 making an API call 524 to the server 212 to create the storage slot. The server 212 then returns 526 a message to the receiving terminal 214 that the storage slot has been created, along with the unique identifier that has been generated and assigned to the storage slot. The creation of the storage slot before the generation of the unique identifier in FIG. 5 is thus another difference between the fourth process flow 500 of FIG. 5 and the first process flow 200 of FIG. 2 because in FIG. 5, the storage slot is created before the mobile terminal 210, the receiving terminal 214 and the server 212 receive and store the unique identifier.

The unique identifier may be transmitted 522 from the receiving terminal 214 to the mobile terminal 210 using a NFC protocol 248 or through a QR code 246 displayed on a display screen of the receiving terminal 214 and scanned by the mobile terminal 210, wherein the unique identifier is extracted from the QR code 246 scanned into the mobile terminal 210. Thus while FIG. 2 uses a forward QR approach to have both the receiving terminal 214 and the mobile terminal 210 receive the unique identifier, FIG. 5 uses a reverse QR approach.

Figure 6:
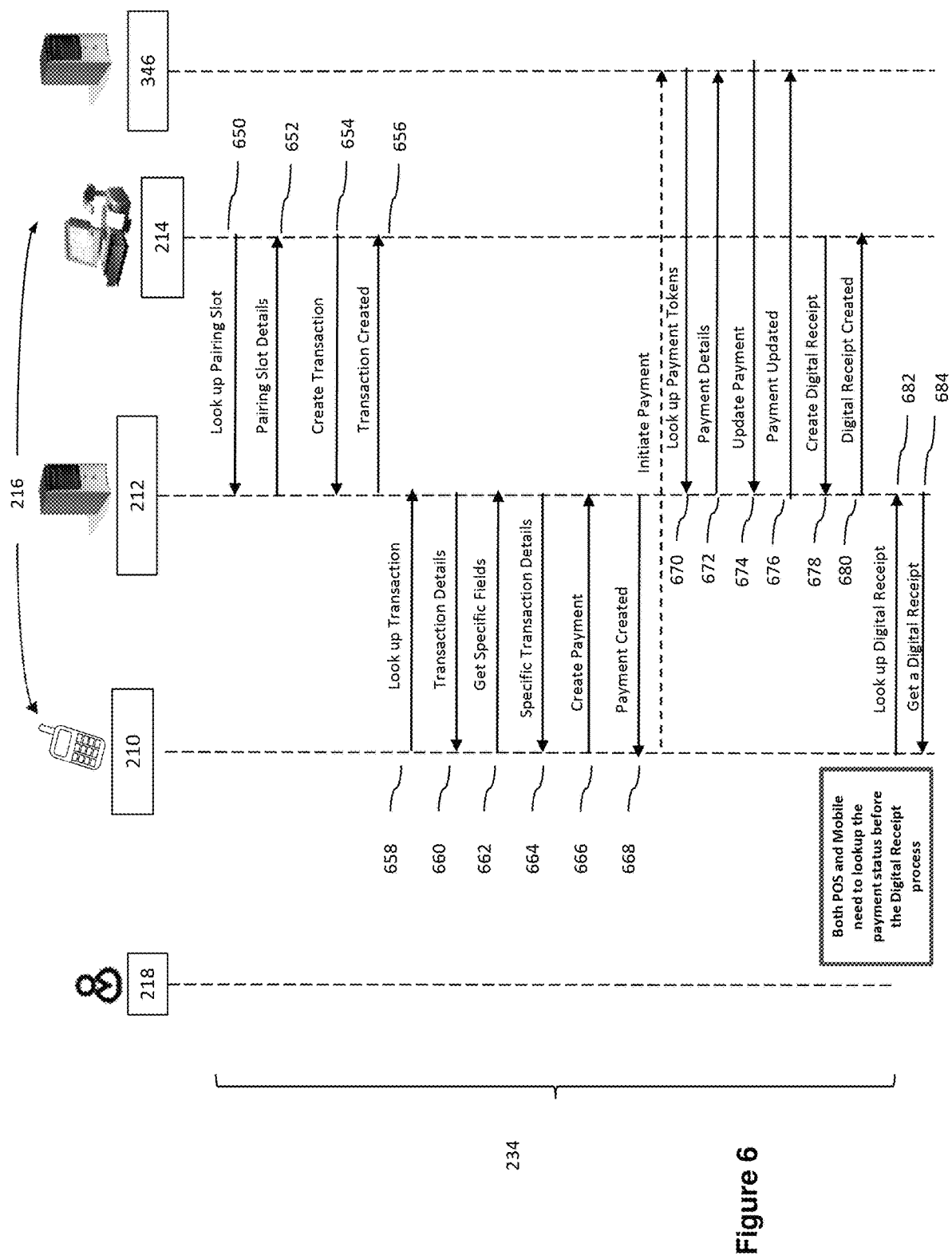
FIG. 6 shows API calls that can be made to complete a transaction after a communication link is established between a mobile terminal and a receiving terminal as per the method described in FIG. 1.

FIG. 6 shows a process flow 600 which provides an example of API calls that can be made between the mobile terminal 210 and the receiving terminal 214 during the processing of the transaction 234 described in the process flows of FIGS. 2 to 5, i.e. the process flow 600 of FIG. 6 occurs after the pairing described in FIGS. 2 to 5 has been completed. The process flow 600 is performed by the same components as in FIGS. 2 to 5, i.e. a mobile terminal 210 (operated by a user 218), a receiving terminal 214 and a server 212 that administers a communication link 216 over which transaction data is transmitted between the mobile terminal 210 and the receiving terminal 214. In addition, there is a payment interface server 346 which is in data communication with the server 212.

Core services in the server 212 will respond to API transaction commands from both the mobile terminal 210 and the receiving terminal 214 to hold and update data on the current transaction taking place. Process flows of specific applications running on the receiving terminal 214 and the mobile terminal 210 will determine the sequence of the API calls made between the mobile terminal 210, the receiving terminal 214, the server 212 and the payment interface server 346, along with commands and processing required to complete a transaction between the mobile terminal 210 and the receiving terminal 214. Accordingly, the sequence of the API calls shown in FIG. 6 is non exhaustive.

The receiving terminal 214 calls 650 the server 212 to look up the storage slot created as described in FIGS. 2 to 5. This call 650 may be made with the unique identifier. The server 212 then returns 652 a message to the receiving terminal 214 that the storage slot has been created and provides details of the storage slot. The receiving terminal 214 indicates 654 to the server 212 that the storage slot will be used to store transaction data that is exchanged during the transaction that occurs over the communication link 216. The server 212 then returns 656 a message to the receiving terminal 214 that the storage slot has been configured to and provides details of the storage slot.

The mobile terminal 210 calls 658 the server 212 to verify that the storage slot has been configured to be ready for the exchange of transaction data. The server 212 then returns 660 a message to the mobile terminal 210 that the storage slot has been so configured and provides details of the storage slot which allow the mobile terminal 210 to pair with the receiving terminal 214. A further call 662 and return 664 may occur between the mobile terminal 210 and the server 212 to obtain specific details of the storage slot.

At the point where the mobile terminal 210 is initialized to make payment for purchased goods and/or services, such as through the use of a digital wallet, the mobile terminal 210 may send 666 a message to the server 212 to configure the storage slot to store details of the payment. The server 212 may then return 668 a message to the mobile terminal 210 that the storage slot is ready to store payment details.

As payment may require tapping into external systems that are used to process the payment, the server 212 has to communicate with the payment interface server 346 that is configured to communicate with such external systems. The payment interface server 346 calls 670 the server 212 to look up payment tokens in the storage slot. The server 212 then returns 672 the payment details stored in the storage slot of the server 212. After the payment has been processed by external systems, the payment interface server 346 informs 674 the server 212 that payment has been made. The server 212 then indicates 676 to the payment interface server 346 to acknowledge that the storage slot has been updated to reflect that payment has been processed.

With the payment having been processed, the receiving terminal 214 can then create a digital receipt that is sent 678 to the server 212 for storage in the storage slot. The server 212 then returns 680 a message to the receiving terminal 214 that the digital receipt has been created.

The mobile terminal 210 sends 682 to the server 212 a request for the digital receipt by, for example, using the unique identifier. The mobile terminal 210 then receives 684 the receipt in response to the mobile terminal 210 requesting for the receipt using the unique identifier. It will be appreciated that before the receipt is retrieved, both the receiving terminal 214 and the mobile terminal 210 verify that the payment has been completed.

Another objective that the method shown in FIG. 1 achieves is to facilitate the management of the redemption of value added services (VAS), such as any one or more of coupons, offers and loyalty program points.

Figure 7:
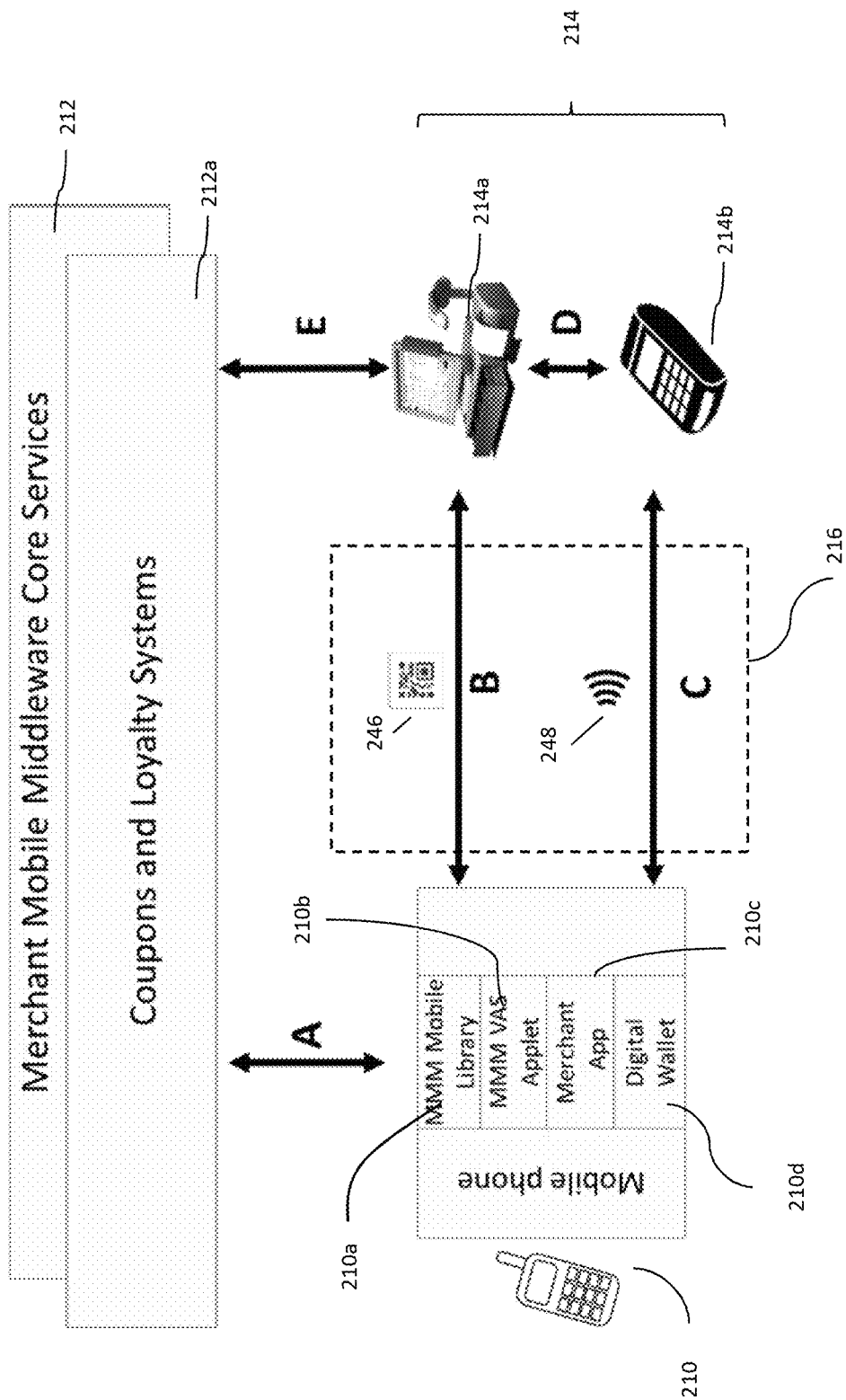
FIG. 7 shows major blocks in a coupon and loyalty model which implements the method described in FIG. 1.

FIG. 7 shows major blocks in a coupon and loyalty model which implements the method described in FIG. 1. The components involved in FIG. 7 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 include a library 210a, a VAS applet, a merchant application 210c and a digital wallet application 210d. The library 210a provides a repository of commands that facilitate communication between the mobile terminal 210, the server 212 and the receiving terminal 214. The merchant application 210c is an application that provides a graphic user interface through which a user accesses to select and redeem value added services, where the merchant application 210c uses both the VAS applet 210b and the library 210a to communicate with the mobile terminal 210 and/or the receiving terminal 214 to redeem selected value added services. The digital wallet application 210d is an application that stores details of electronic payment cards that can be used to pay good and/or services and is separate to the merchant application 210c. The major block of the server 212 is a coupon and loyalty processing block 212a.

The interactions A, B, C and D shown in FIG. 7 are described below.

In interaction A, coupons are provisioned to the mobile terminal 210 through the merchant application 210a for the user to browse, save and use. Redeemed coupons are also synchronized at a backend. Loyalty cards are registered to the mobile terminal 210 and a loyalty ID is created, which may be the primary identifier of the loyalty card. The merchant application 210a also synchronizes to the loyalty system to update a balance in a loyalty account stored in the mobile terminal 210.

Interactions B and C are for data exchange that facilitates VAS redemption. Coupons and loyalty ID may be transferred via NFC 248 or QR Code 246 from the VAS applet 210b to a VAS kernel in the payment terminal 214b or to a QR code reader of the POS terminal 214a. Before this exchange of transaction data relating to redemption of value added services occurs, authentication of the mobile terminal 210 to the receiving terminal 214 may be performed. The authentication is described with reference to either one of FIGS. 2 to 5.

Figure 17:
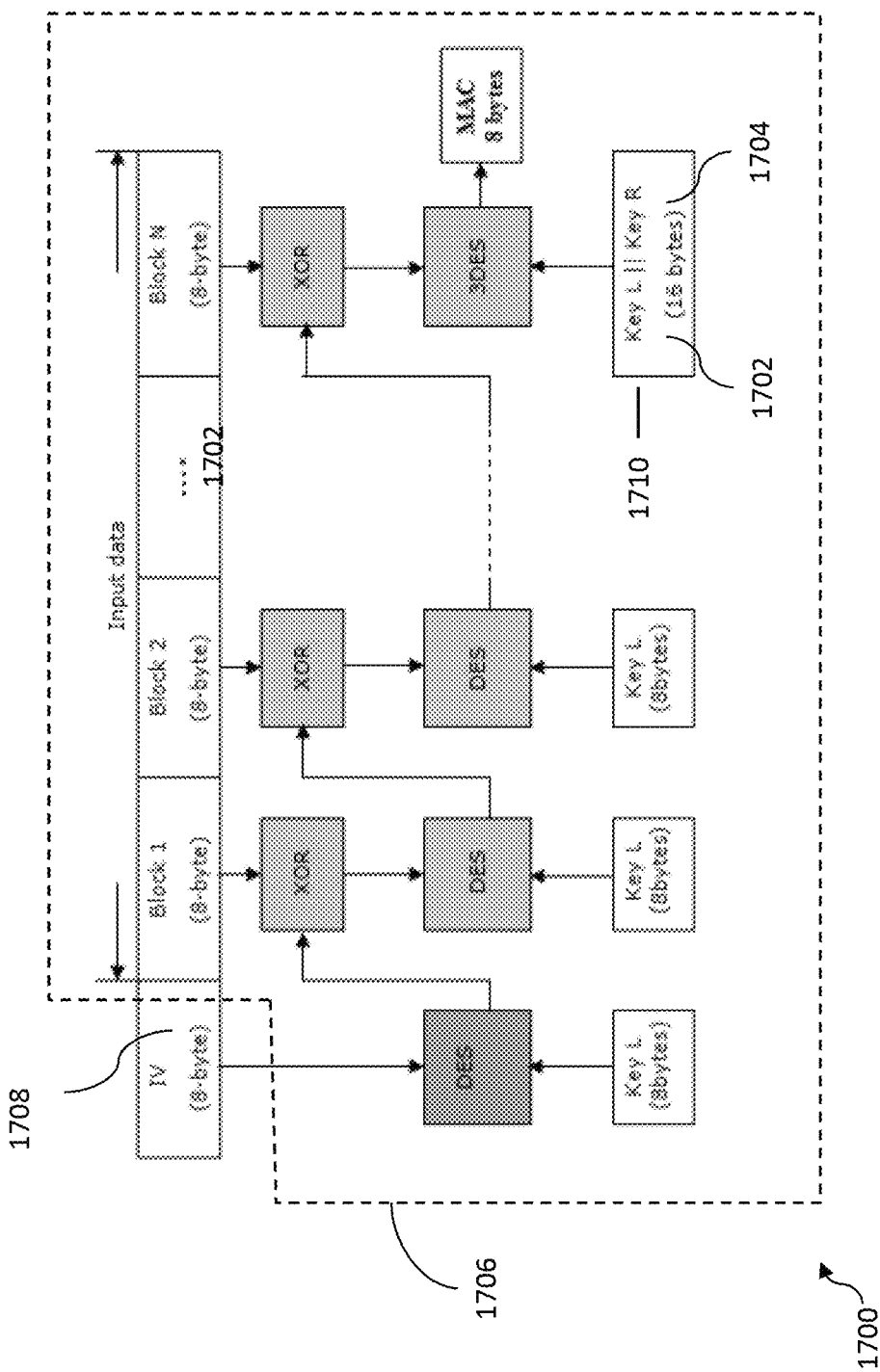
FIG. 17 shows a schematic of a data packet that results from performing authentication of a mobile terminal before exchange of transaction data relating to the redemption of value added services.

The mobile terminal 210 retrieves an authentication code stored in the storage slot of the server 212. The receiving terminal 214 receives the authentication code from the mobile terminal 210 and compares the received authentication code against an authentication code generated by the receiving terminal 214 based on data from the mobile terminal. The mobile terminal 210 is then authenticated in response to confirmation of a match between the received authentication code and the generated authentication code. A schematic of the data packet that is created while performing this match is shown in FIG. 17 and described later in greater detail. The authentication code may be stored in the storage slot in response to the receiving terminal 214 transmitting the authentication code, stored in the receiving terminal 214, to the server 212. The authentication code may be generated in the receiving terminal 214 using an encryption key kept in the receiving terminal 214.

In the interaction C for data exchange using NFC; if the payment terminal 214b is configured to perform instant redemption of coupon and loyalty points, an updated transaction total can be calculated and payment carried out in a single tap of the mobile terminal 210. Otherwise, the payment terminal 214b passes the received coupon and loyalty details to the POS terminal 214a for redemption. When a new transaction total is calculated, after the application of the redeemed coupon and loyalty points, the customer is prompted to tap the mobile terminal 210 again at the payment terminal 214b so as to effect payment through the digital wallet application 210d.

In interaction D, loyalty points earned or redeemed and payment status is exchanged between the POS terminal 214a and the payment terminal 214b.

In interaction E, data is exchanged that allows synchronization of the loyalty points after payment is completed. The synchronization that occurs in interaction E updates a balance in a loyalty account stored in the receiving terminal 214. With reference to the interaction A, there is synchronization of a balance of a loyalty account stored in the mobile terminal 210 and the receiving terminal 214. This synchronization occurs in response to an exchange, between the mobile terminal 210 and the receiving terminal 214, of the data used to facilitate the redemption of the value added services. The loyalty account in both the mobile terminal 210 and the receiving terminal 214 are thus updated when there is redemption of value added services.

Figure 8:
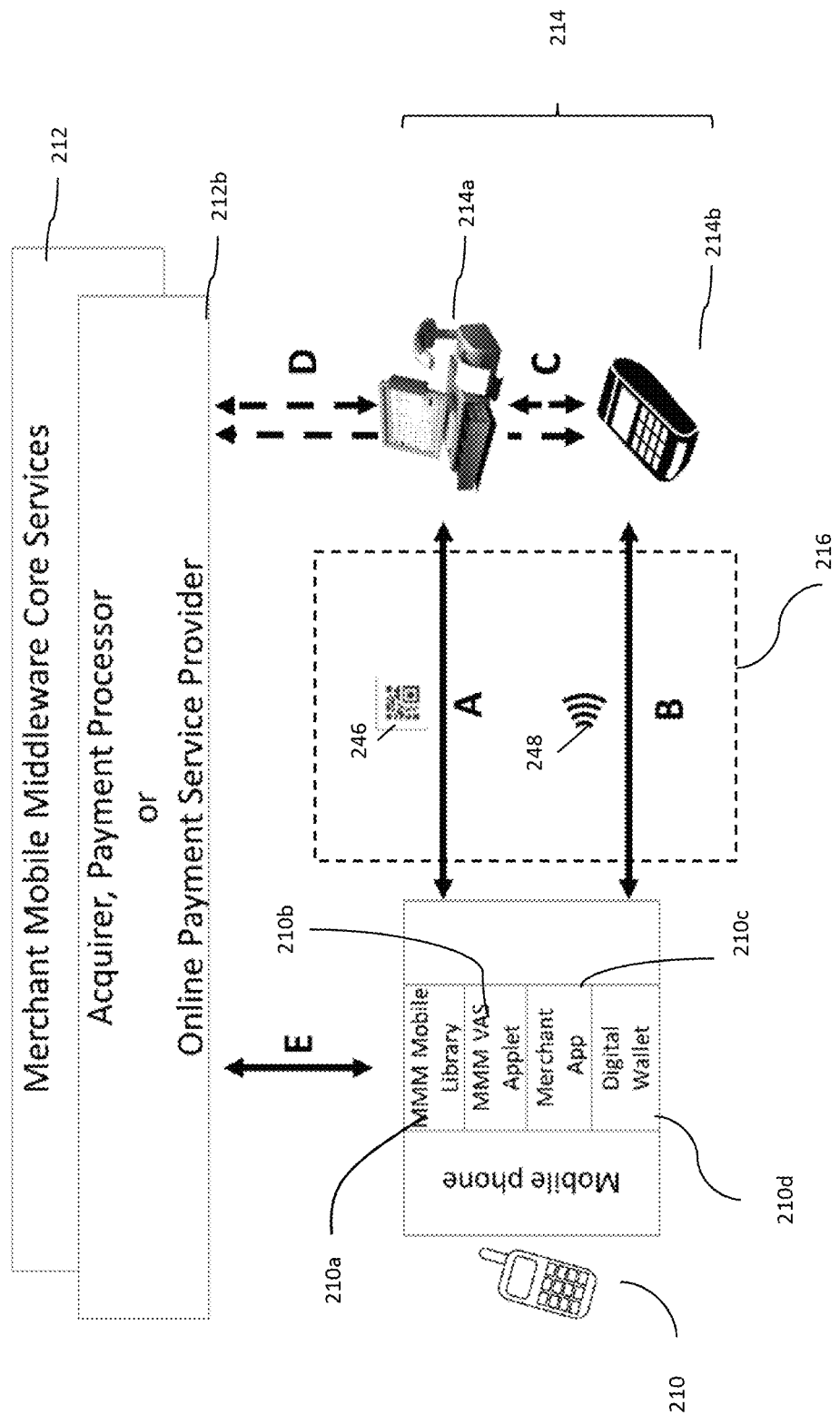
FIG. 8 shows major blocks in a payment model which implements the method described in FIG. 1.

FIG. 8 shows major blocks in a payment model which implements the method described in FIG. 1. The components involved in FIG. 8 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 are as described with reference to FIG. 7. The major block of the server 212 is a payment processing block 212b.

The interactions A, B C, D and E shown in FIG. 8 are described below.

In interaction A, use of the QR code 246 to initiate payment will have the mobile terminal 210 pass information required to start or inform the POS terminal 214a of a process used to make payment. This could be via an online payment between the mobile phone 210 and an online payment service provider, accessible through the payment processing block 212b via interaction E, a card-on-file payment between the POS terminal 214a and a payment processor, accessible through the payment processing block 212b via interaction D, or any other form of remote payment.

In interaction B, processing of NFC 248 based payment will follow an agreement method, known by those skilled in the art, for performing a NFC based contactless payment between the mobile terminal 210 and the payment terminal 214b.

Interaction C occurs between the POS terminal 214a and the payment terminal 214b if the payment terminal 214b connects to an acquirer (i.e. a merchant's bank) through the POS terminal 214a. On the other hand, the payment terminal 214b may connect to the acquirer directly, i.e. without the need for interaction C.

Interaction D provides a connection, through the payment processing block 212b, to support communication with an acquirer, a payment processor or an online payment service provider when the mobile terminal 210 uses a QR code 246 to initiate payment. This will allow the POS terminal 214a to be updated with an outcome of the remote payment process. The core services provided by the server 212 thus allows for simple merchant implementation of a remote connection to facilitate such a remote payment.

Interaction E provides a connection for QR Code 246 based transaction, by allowing the mobile terminal 210 to be paired with the POS terminal 214a via the server 212, allows remote payment to take place when initiated via the mobile terminal 210. The connection provided by interaction E can also be used for the delivery of an electronic receipt (for both the QR code 246 and NFC 248 cases).

Figure 9:
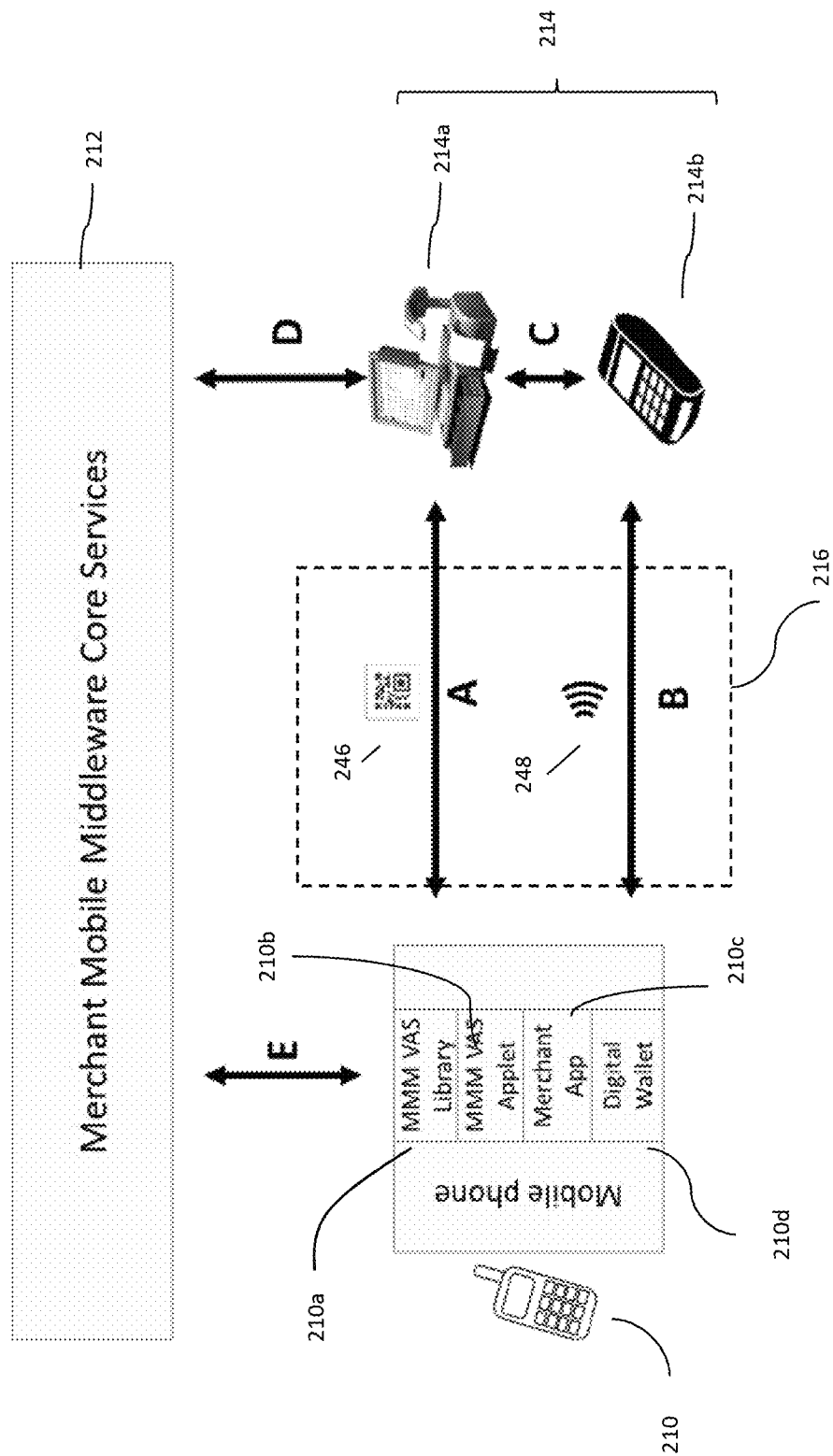
FIG. 9 shows major blocks in a model which provides a digital receipt, wherein the model implements the method described in FIG. 1.

FIG. 9 shows major blocks in a model which provides a digital receipt, wherein the model implements the method described in FIG. 1. The components involved in FIG. 9 are the same as those described with respect to FIGS. 2 to 5, i.e. a mobile terminal 210, a receiving terminal 214 and a server 212 that administers a communication link 216 over which transaction data is transmitted between the mobile terminal 210 and the receiving terminal 214. The receiving terminal 214 may comprise a POS terminal 214a and a payment terminal 214b.

The major blocks of the mobile terminal 210 are as described with reference to FIG. 7.

The interactions A, B C, D and E shown in FIG. 9 are described below.

In interaction A, a unique identifier or pairing ID is generated in the mobile terminal 210 and transferred to the POS terminal 214a via a QR Code 246. Similarly, in interaction B, a unique identifier or pairing ID is passed from the mobile terminal 210 to the payment terminal 214b via an NFC 248 tap. Further detail on interactions A and B was described earlier with reference to FIG. 2.

In interaction C, the payment terminal 214b will pass on the unique identifier, received by the NFC tap, to the POS terminal 214b.

Interaction D occurs after payment is successfully processed, where the POS terminal 214b will push the unique identifier and receipt information to the core services of the server 212.

In interaction E, the merchant application 210c will pull the receipt information from the core services of the server 212 using the unique identifier as the transaction identifier.

Figure 10:
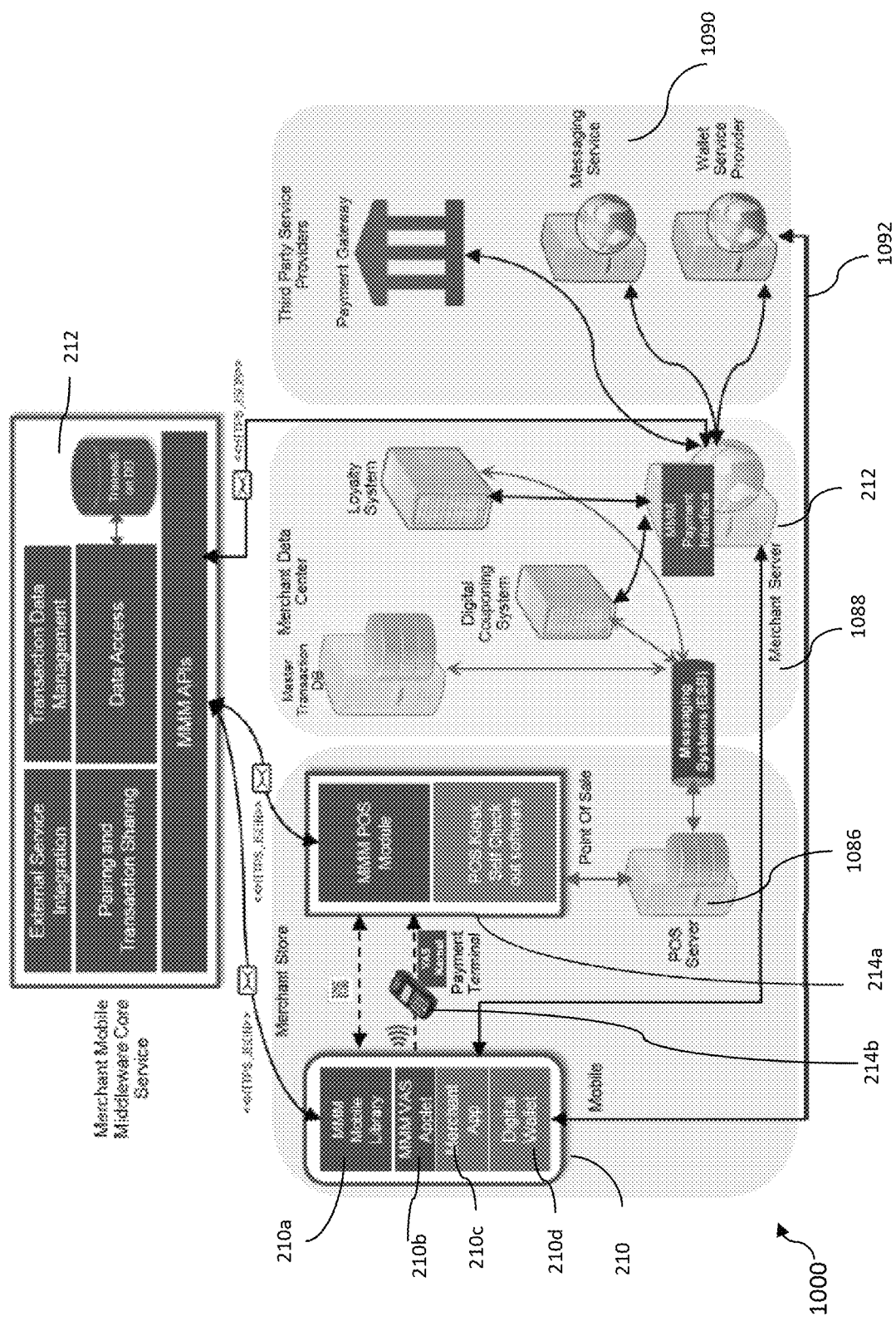
FIG. 10 shows an architectural schematic of a system that uses the server described with reference to FIGS. 2 to 9.

FIG. 10 shows an architectural schematic of a system 1000 that uses the server 212 described with reference to FIGS. 2 to 9. The various components of the mobile terminal 210, the POS terminal 214a, the payment terminal 214b are as described above. The digital wallet application 210d of the mobile terminal 210 communicates 1092 with third party service providers 1090 using a communication technique that is known by those skilled in the art. FIG. 10 also shows that the server 212 is part of merchant data center 1088 hardware. However, it will be appreciated that the server 212 may be deployed as: a shared cloud service using open API infrastructure; a third party shared service platform offered by payment Terminal and POS vendors; or a retailer owned cloud-based infrastructure.

The server 212 enables a seamless shopping experience by combining value added services (VAS) for loyalty, coupons, vouchers or rewards with mobile terminal 210 payment at a merchant store. In FIG. 10, the merchant data center 1088 includes systems for administering loyalty points, digital coupons and for keeping loyalty point records of an account holder.

The server 212 provides a means to pair the mobile terminal 210 and the receiving terminal 214 at a merchant store, by facilitating the establishment of a communication link 216 (see FIGS. 2 to 5) between the mobile terminal 210 and the receiving terminal 214. The pairing of the mobile terminal 210 with the receiving terminal 214 enables the sharing of transaction details between the mobile terminal 210 and the receiving terminal 214. The mobile terminal 210 can also retrieve transaction data for value added service redemptions and for a digital receipt.

The core services of the server 212 are designed to provide flexibility allowing different implementations to be deployed depending on the merchant requirements and the distribution of services across different value added and payment service providers. The four process flows 200, 300, 400 and 500 of FIGS. 2 to 5 provide four different implementations, although other implementations would be realizable by those skilled in the art.

The core services of the server 212 comprise six modules, namely APIs, pairing and transaction sharing, transaction DB (database), data access, transaction data management;

and external service integration, where each has dedicated functionality as described below.

The APIs module is a set of RESTFul APIs exposed for external access. Representational State Transfer (REST) is an architectural style that specifies constraints, such as a uniform interface, that if applied to a web service induces desirable properties, such as performance, scalability, and modifiability that enable services to work best on the Web. In the REST architectural style, data and functionality are considered resources and are accessed using Uniform Resource Identifiers (URIs), typically links on the Web. The resources are acted upon by using a set of simple, well-defined operations. The REST architectural style is constrained to a client/server architecture and is designed to use a stateless communication protocol, typically HTTP. In the REST architecture style, clients and servers exchange representations of resources by using a standardized interface and protocol. The APIs act as a gateway for the other core services provided by the server 212. Mobile applications and other components can access the exposed APIs to execute defined functions. There is no business or decision logic associated with this component, the process would be to accept incoming requests from external components and extract the payload or data and pass this as a request message to another core service component which has the business processing logic to execute the request. The response to a request is also delivered back to the external component that sent the request.

The pairing and transaction sharing module is used to pair or virtually integrate the mobile terminal 210 with the receiving terminal 214 for a current transaction. The mobile terminal 210 and the receiving terminal 214 can be paired by calling the specific pairing APIs provided by the core services of the server 212

The transaction DB module provides persistent storage of transaction data. The Transaction DB can be accessed via a data access component. Transaction data will be used for value added services redemption and for providing digital receipts, savings comparison and analytics.

The data access module is used to retrieve and store supported data from the Transaction DB. This module abstracts all the database activities from other components in the core services of the server 212. This component will manage database connection, query statement execution and store procedure execution. Other components may use the data access module to execute transaction DB related operations.

The transaction data management module will manage the transaction data held on the transaction DB module. This module will store the transaction status and digital receipts retrieved from the receiving terminal 214.

The external service integration module is used to integrate external services into the server 212. External service can be third party loyalty service providers or other VAS providers.

Figure 11:
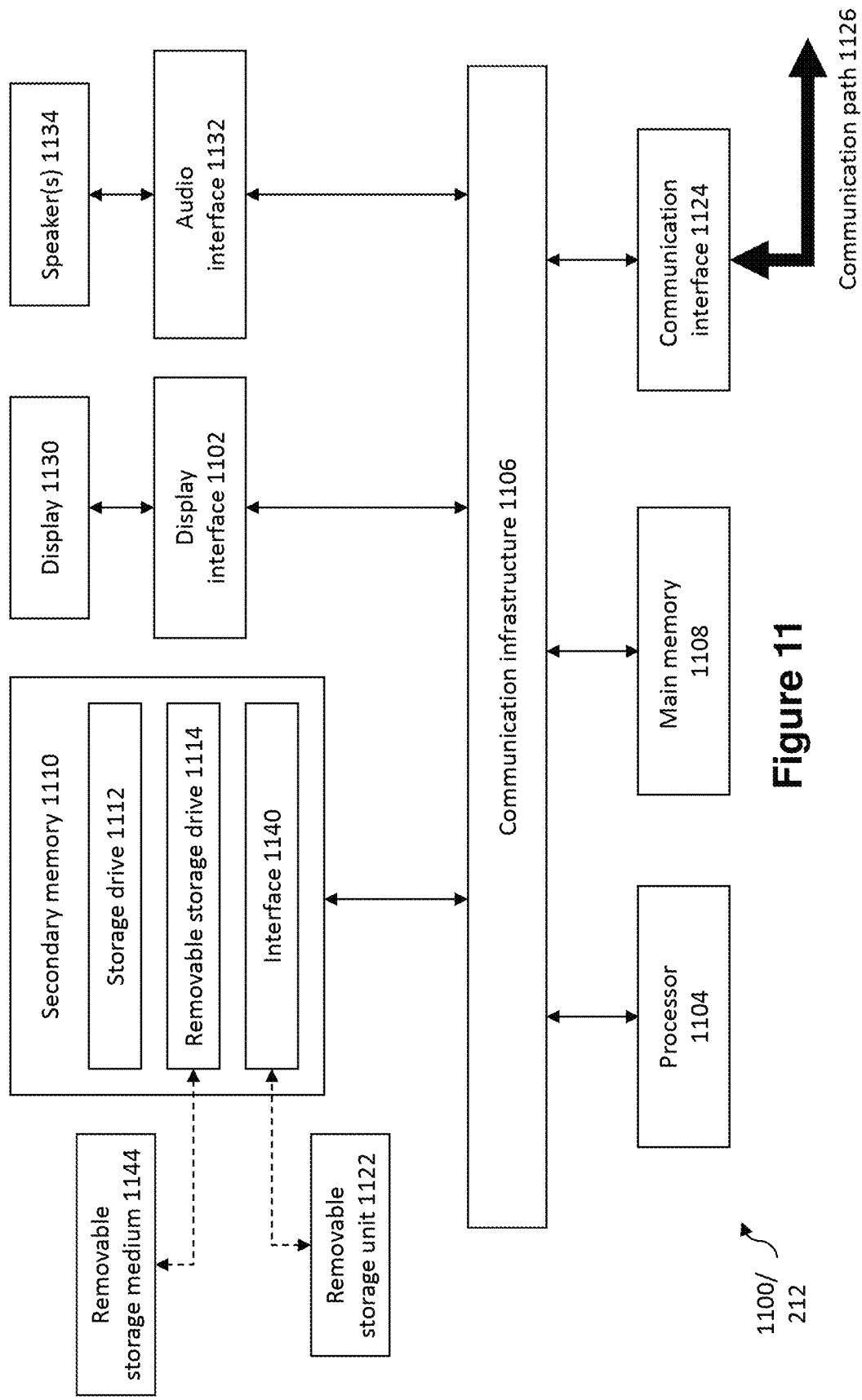
FIG. 11 depicts an exemplary computing device used to execute the method described in FIG. 1.

FIG. 11 depicts an exemplary computing device 1100, hereinafter interchangeably referred to as a computer system 1100, where one or more such computing devices 1100 may be used to execute the method described in FIG. 1 for enabling a communication link over which transaction data is transmitted between a mobile terminal and a receiving terminal. The following description of the computing device 1100 is provided by way of example only and is not intended to be limiting.

As shown in FIG. 11, the example computing device 1100 includes a processor 1104 for executing software routines. Although a single processor is shown for the sake of clarity, the computing device 1100 may also include a multi-processor system. The processor 1104 is connected to a communication infrastructure 1106 for communication with other components of the computing device 1100. The communication infrastructure 1106 may include, for example, a communications bus, cross-bar, or network.

The computing device 1100 further includes a main memory 1108, such as a random access memory (RAM), and a secondary memory 1110. The secondary memory 1110 may include, for example, a storage drive 1112, which may be a hard disk drive, a solid state drive or a hybrid drive and/or a removable storage drive 1114, which may include a magnetic tape drive, an optical disk drive, a solid state storage drive (such as a USB flash drive, a flash memory device, a solid state drive or a memory card), or the like. The removable storage drive 1114 reads from and/or writes to a removable storage medium 1144 in a well-known manner. The removable storage medium 1144 may include magnetic tape, optical disk, non-volatile memory storage medium, or the like, which is read by and written to by removable storage drive 1114. As will be appreciated by persons skilled in the relevant art(s), the removable storage medium 1144 includes a computer readable storage medium having stored therein computer executable program code instructions and/or data.

In an alternative implementation, the secondary memory 1110 may additionally or alternatively include other similar means for allowing computer programs or other instructions to be loaded into the computing device 1100. Such means can include, for example, a removable storage unit 1122 and an interface 1140. Examples of a removable storage unit 1122 and interface 1140 include a program cartridge and cartridge interface (such as that found in video game console devices), a removable memory chip (such as an EPROM or PROM) and associated socket, a removable solid state storage drive (such as a USB flash drive, a flash memory device, a solid state drive or a memory card), and other removable storage units 1122 and interfaces 1140 which allow software and data to be transferred from the removable storage unit 1122 to the computer system 1100.

The computing device 1100 also includes at least one communication interface 1124. The communication interface 1124 allows software and data to be transferred between computing device 1100 and external devices via a communication path 1126. In various embodiments of the inventions, the communication interface 1124 permits data to be transferred between the computing device 1100 and a data communication network, such as a public data or private data communication network. The communication interface 1124 may be used to exchange data between different computing devices 1100 which such computing devices 1100 form part an interconnected computer network. Examples of a communication interface 1124 can include a modem, a network interface (such as an Ethernet card), a communication port (such as a serial, parallel, printer, GPIB, IEEE 1394, RJ45, USB), an antenna with associated circuitry and the like. The communication interface 1124 may be wired or may be wireless. Software and data transferred via the communication interface 1124 are in the form of signals which can be electronic, electromagnetic, optical or other signals capable of being received by communication interface 1124. These signals are provided to the communication interface via the communication path 1126.

As shown in FIG. 11, the computing device 1100 further includes a display interface 1102 which performs operations for rendering images to an associated display 1130 and an audio interface 1132 for performing operations for playing audio content via associated speaker(s) 1134.

As used herein, the term "computer program product" may refer, in part, to removable storage medium 1144, removable storage unit 1122, a hard disk installed in storage drive 1112, or a carrier wave carrying software over communication path 1126 (wireless link or cable) to communication interface 1124. Computer readable storage media refers to any non-transitory, non-volatile tangible storage medium that provides recorded instructions and/or data to the computing device 1100 for execution and/or processing. Examples of such storage media include magnetic tape, CD-ROM, DVD, Blu-ray™ Disc, a hard disk drive, a ROM or integrated circuit, a solid state storage drive (such as a USB flash drive, a flash memory device, a solid state drive or a memory card), a hybrid drive, a magneto-optical disk, or a computer readable card such as a PCMCIA card and the like, whether or not such devices are internal or external of the computing device 1100. Examples of transitory or non-tangible computer readable transmission media that may also participate in the provision of software, application programs, instructions and/or data to the computing device 1100 include radio or infra-red transmission channels as well as a network connection to another computer or networked device, and the Internet or Intranets including e-mail transmissions and information recorded on Websites and the like.

The computer programs (also called computer program code) are stored in main memory 1108 and/or secondary memory 1110. Computer programs can also be received via the communication interface 1124. Such computer programs, when executed, enable the computing device 1100 to perform one or more features of embodiments discussed herein. In various embodiments, the computer programs, when executed, enable the processor 1104 to perform features of the above-described embodiments. Accordingly, such computer programs represent controllers of the computer system 1100.

Software may be stored in a computer program product and loaded into the computing device 1100 using the removable storage drive 1114, the storage drive 1112, or the interface 1140. Alternatively, the computer program product may be downloaded to the computer system 1100 over the communications path 1126. The software, when executed by the processor 1104, causes the computing device 1100 to perform the method as described in FIG. 1.

It is to be understood that the embodiment of FIG. 11 is presented merely by way of example. Therefore, in some embodiments one or more features of the computing device 1100 may be omitted. Also, in some embodiments, one or more features of the computing device 1100 may be combined together. Additionally, in some embodiments, one or more features of the computing device 1100 may be split into one or more component parts.

It will be appreciated that the elements illustrated in FIG. 11 function to provide means for performing the method as described with respect to FIG. 1. For example, the computing device 1100 may be used to realise the server 212 shown in FIGS. 2 to 10. As described in FIGS. 2 to 10, the server 212 enables the communication link 216 over which transaction data is transmitted between the mobile terminal 210 and the receiving terminal 214. The server 212 comprises: at least one processor 1104 and at least one memory 1108 including computer program code.

The at least one memory 1108 and the computer program code are configured to, with the at least one processor 1104, cause the server 212 at least to: store a generated unique identifier used to facilitate the enablement of the communication link 216. A storage slot is then created for administering the communication link 216. The storage slot is assigned the unique identifier and the storage slot used to store the transaction data and the unique identifier. The communication link 216 is then utilised to transmit the transaction data between the mobile terminal 210 and the receiving terminal 214 in response to either of the mobile terminal 210 or the receiving terminal 214 referencing the unique identifier to the server 212.

In one implementation, the processor 1104 may be further configured to cause the server 212 to generate the unique identifier in response to a prompt received from the receiving terminal 214, for example, through the API call 224 made from the receiving terminal 214 to the server 212, as described in FIG. 3.

In another implementation, the unique identifier is received from the receiving terminal 214, such as described in FIGS. 2 and 4.

The computing device 1100 of FIG. 11 may execute the method shown in FIG. 1 when the computing device 1100 executes instructions which may be stored in any one or more of the removable storage medium 1144, the removable storage unit 1122 and storage drive 1112. These components 1122, 1144 and 1112 provide a non-transitory computer readable medium having stored thereon executable instructions for controlling the server 212, realised by the computing device 1100, to perform steps comprising: a) storing a generated unique identifier used to facilitate the enablement of the communication link 216 over which transaction data is transmitted between the mobile terminal 210 and the receiving terminal 214; b) creating a storage slot at the server 212; c) assigning the unique identifier to the storage slot; d) configuring the storage slot to store the transaction data; and e) enabling the communication link 216 to be utilizable to transmit the transaction data between the mobile terminal 210 and the receiving terminal 214 in response to either of the mobile terminal 210 or the receiving terminal 214 referencing the unique identifier to the server 212.

From FIGS. 2 to 6, along with their above accompanying description, the overall function of the server 212 is to provide a connection between the mobile terminal 210 and the receiving terminal 214 to allow different services to be performed under a single transaction. These services include: i) integration with an existing value added services management system (which may contain architecture such as a processing application described below with reference to FIG. 12) that is configured to process the redemption of value added services, the value added services including coupons, membership and loyalty program points; ii) payment and iii) return of an electronic receipt to the mobile terminal 210.

The value added services management system may be operated and proprietary to a merchant or provided by a third party. In one implementation, the value added services management system redeems or reverses value added services (such as coupons) using an architecture such as the one shown in FIG. 7. The mobile terminal 210 may use a merchant application 210c to facilitate the redemption of value added services and the digital wallet application 210d for payment.

Figure 12:
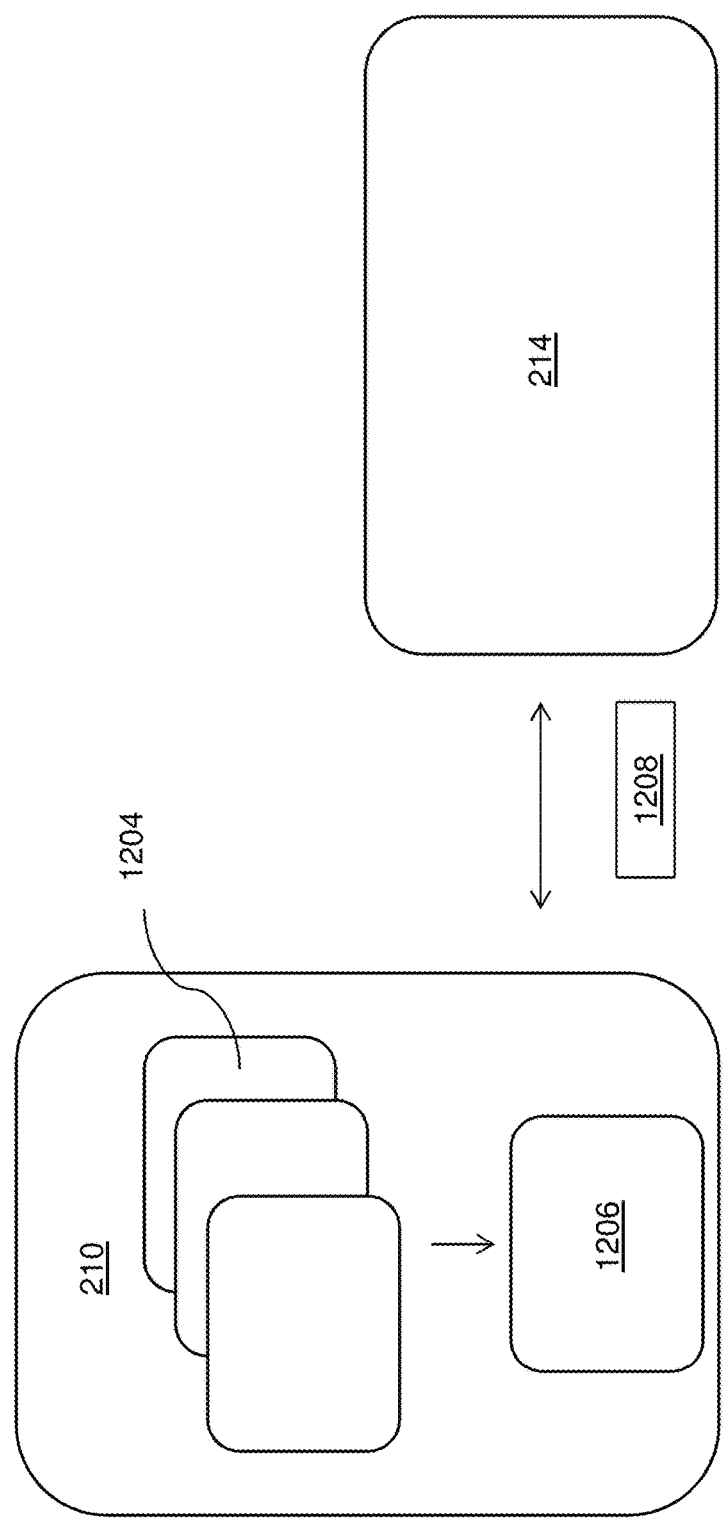
FIG. 12 shows a schematic of an architecture used to standardise data communication to facilitate exchange of data between a mobile terminal and a receiving terminal for the redemption of value added services.

To redeem value added services, the mobile terminal 210 may use one or more merchant applications (interchangeably referred to as "a redemption application"), configured to facilitate the redemption of value added services, to communicate with the receiving terminal 214. Such redemption applications are each associated with a merchant providing the value added services FIG. 12 shows a schematic of an architecture used to standardise data communication between a plurality of redemption applications 1204 each configured to facilitate redemption of value added services, wherein the plurality of redemption applications 1204 are installed in the mobile terminal 210, and a processing application configured to process the value added services transmitted by the mobile terminal 210, the processing application being hosted on the receiving terminal 214.

To standardise data communication between the plurality of redemption applications 1204 installed in the mobile terminal 210 and the processing application hosted on the receiving terminal 214, a bridging application 1206, installed in the mobile terminal 210, is activated to establish communication between the plurality of redemption applications 1204 installed in the mobile terminal 210 and the processing application hosted on the receiving terminal 214. The communication facilitates the redemption of the value added services, wherein the bridging application 1206 standardises the communication by instituting a set of commands used by the plurality of redemption applications 1206 and the processing application to transmit and receive data 1208 (represented as a data packet) that facilitates the redemption of the value added services.

The bridging application 1206 may be implemented as an applet or a HCE (Host Card Emulation) application. The bridging application 1206 acts as a common library to each of the plurality of redemption applications 1204, so that once such a bridging application 1206 is installed in the mobile terminal 210, installation of further redemption applications would not require the reinstallation of the bridging application 1206. This in turn means that each redemption application 1204 would take up less space since they share the common library provided by the bridging application 1206. In addition, the bridging application 1206 ensures compatibility between the processing application hosted at the receiving terminal 214 and each of the redemption applications 1204. This is achieved, for example, by the plurality of redemption applications 1204 and the processing application each comprising a library having a repository of commands that allows the bridging application 1206 to communicate with each of the plurality of redemption applications 1204 and the bridging application 1206 to communicate with the processing application.

The set of commands used by the plurality of redemption applications 1206 comprise internal commands, wherein the internal commands are used within the mobile terminal 210 to transmit and receive, between the bridging application 1006 and the plurality of redemption applications 1204, the data 1208 used for the redemption of the value added services. These internal commands are recognized by each of the plurality of redemption applications 1204. These internal commands include commands that attach information relating to the value added services being redeemed and allow for identification means of the merchant providing the value added services into the data 1208; commands that read coupons being exchanged between the mobile terminal 210 and the receiving terminal 214 through the data 1208; and reset the data 1208. The internal commands are compliant with an operating system of the mobile terminal 210.

The set of commands used by the bridging application 1206 and the processing application are compliant with a protocol used to transmit and receive the data 1208 used for the redemption of the value added services. The protocol is based on NFC communication standard, so that the mobile terminal 210 may use a NFC process to send the data 1208 to the receiving terminal 214. The analogue, digital and protocol layers of the NFC process are, in one implementation, defined by existing ISO and EMV (Europay™, MasterCard™, and Visa™) contactless standards and may, for example, require for the receiving terminal 214 to be EMVCo Level 1 and Level 2 certified.

The processing application may be configured to detect for the presence of the bridging application 1206 before transmitting the data 1008 that facilitates the redemption of the value added services. At the receiving terminal 214 end, the processing application may apply one or more of commands that set up exchange of the data 1208, between the mobile terminal 210 and the receiving terminal 214 and allow for an update of a coupon status in the receiving terminal 214.

Figure 13:
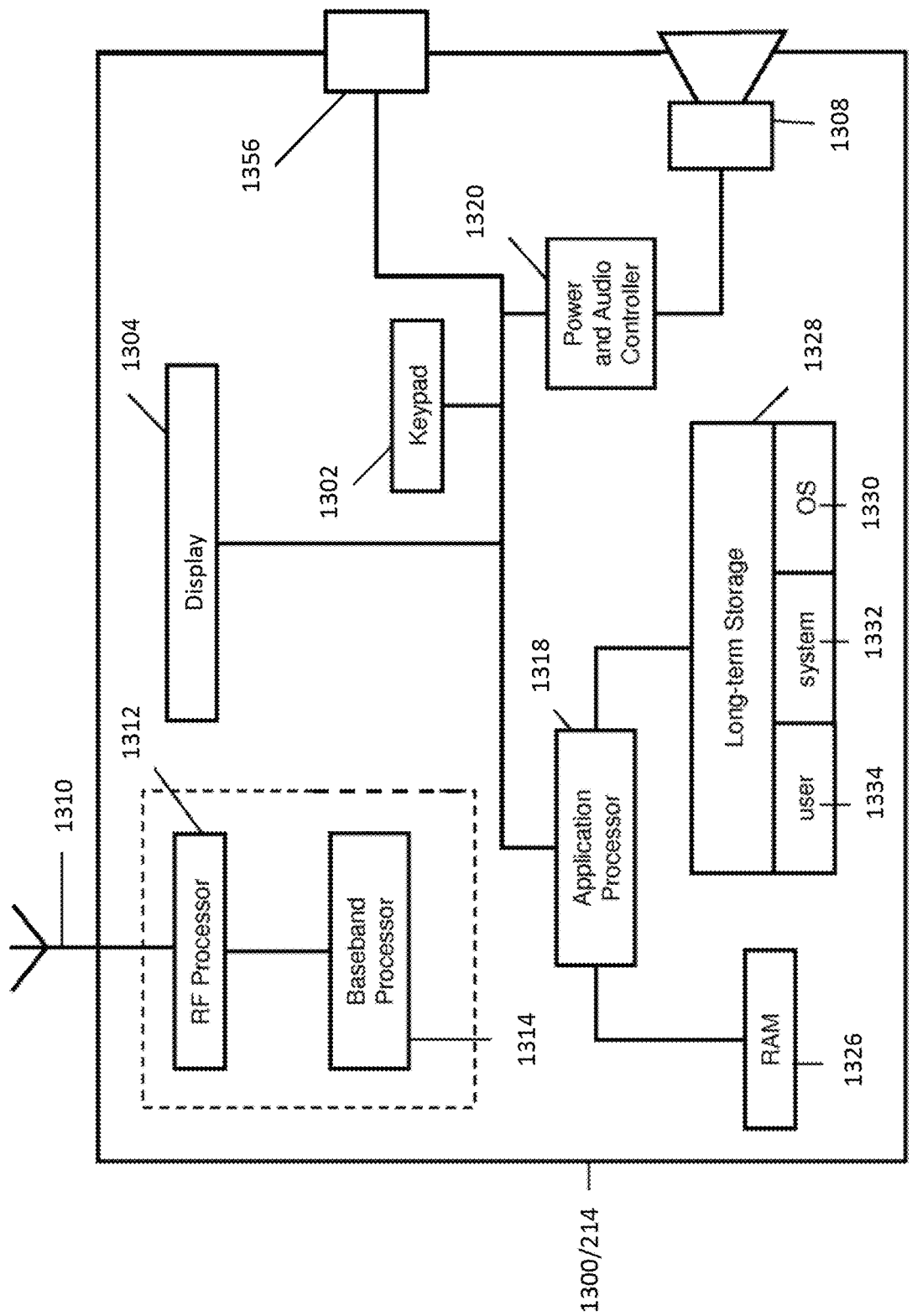
FIG. 13 is a schematic of a computing device used to implement the receiving terminal shown in FIGS. 2 to 10 and 12.

FIG. 13 is a schematic of a computing device 1300 that may be utilized to implement the receiving terminal 214 shown in FIGS. 2 to 10 and 12. The wireless device 1100 may be in communication (e.g. through NFC or via a QR code) with the mobile terminal 210.

The computing device 1300 comprises a keypad 1302, a display 1304, a speaker 1308 and an antenna 1310. Communication hardware that is used to enable NFC communication with the mobile terminal 210 is represented by RF processor 1312 which provides an RF signal to the antenna 1310 for the transmission of data signals, and the receipt therefrom. Additionally provided is a baseband processor 1314, which provides signals to and receives signals from the RF Processor 1312.

The keypad 1302 and the display 1304 are controlled by an application processor 1318. The display 1304 is used to provide an indication of the status of the receiving terminal 214, such as payment options available when the receiving terminal 214 detects that it is being used to receive electronic payment or that the receiving terminal 214 is processing payment after a payment option is selected through the keypad 1302, A power and audio controller 1320 is provided to supply power to the RF processor 1312 and the baseband processor 1314, the application processor 1318, and other hardware. The power and audio controller 1320 also controls audio output via the speaker 1308. The speaker 1308 is used to provide sounds to indicate that a data transaction with the receiving terminal 214 has been successfully completed.

In order for the application processor 1318 to operate, various different types of memory are provided. Firstly, the computing device 1300 includes Random Access Memory (RAM) 1326 connected to the application processor 1318 into which data and program code can be written and read from at will. Code placed anywhere in RAM 1326 can be executed by the application processor 1318 from the RAM 1326. RAM 1326 represents a volatile memory of the computing device 1300.

Secondly, the computing device 1300 is provided with a long-term storage 1328 connected to the application processor 1318. The long-term storage 1328 comprises three partitions, an operating system (OS) partition 1330, a system partition 1332 and a user partition 1334. The long-term storage 1328 represents a non-volatile memory of the computing device 1300.

In the present example, the OS partition 1330 contains the firmware of the computing device 1300 which includes an operating system. Other computer programs may also be stored on the long-term storage 1328, such as application programs, and the like. In particular, application programs which are mandatory to the computing device 1300 are typically stored in the system partition 1332. The application programs stored on the system partition 1332 would typically be those which are bundled with the computing device 1300 by the device manufacturer when the computing device 1300 is first sold. Application programs which are added to the computing device 1300 by the user would usually be stored in the user partition 1334.

The computing device 1300 also comprises an image capturing module 1356. The image capturing module, together with a suitable application, may be used to capture/scan QR codes and process the data embedded in the QR code.

The receiving terminal 214 is configured to utilise the communication link 216, administered by the server 212, over which transaction data is transmitted between the mobile terminal 210 and the receiving terminal 214. To utilise this communication link 216, the at least one processor (e.g. application processor 1318) and the at least one memory (e.g. RAM 1326, long-term storage 1328) with its computer program code are configured to cause the receiving terminal 214 at least to store a generated unique identifier used to facilitate the enablement of the communication link 216. The at least one memory and the computer program code are further configured to, with the at least one processor, detect, using the unique identifier, for the presence of a storage slot at the server 212 administering the communication link 216, the storage slot being assigned the unique identifier and the storage slot used to store the transaction data. The receiving terminal 214 can then access the communication link to transmit the transaction data between the mobile terminal 210 and the receiving terminal 214 by referencing the unique identifier to the server 212.

The receiving terminal 214 of FIG. 13 may execute the method shown in FIG. 1 when the receiving terminal 214 executes instructions which may be stored in any one or more of the RAM 1326 or the long-term storage 1328. These components 1326 and 1328 provide a non-transitory computer readable medium having stored thereon executable instructions for controlling the receiving terminal 214 to perform steps comprising: a) storing a generated unique identifier used to facilitate the enablement of the communication link 216 over which transaction data is transmitted between the mobile terminal 210 and the receiving terminal 214; b) detecting, using the unique identifier, for the presence of a storage slot at the server 212 administering the communication link, the storage slot being assigned the unique identifier and the storage slot used to store the transaction data; and c) accessing the communication link 216 to transmit the transaction data between the mobile terminal 210 and the receiving terminal 214 by referencing the unique identifier to the server 212.

With reference to FIG. 12, the receiving terminal 214 is further configured to host the processing application configured to redeem value added services transmitted by the mobile terminal 210 at which is installed the plurality of redemption applications 1204 configured to facilitate the redemption of the value added services. To facilitate this redemption of value added services, the at least one processor (e.g. application processor 1318) and the at least one memory (e.g. RAM 1326, long-term storage 1328) with its computer program code are configured to cause the receiving terminal 214 at least to detect for the presence of the bridging application 1206 installed in the mobile terminal 210, the bridging application 1206 instituting a set of commands used by the plurality of redemption applications 1204 and the processing application to transmit and receive data 1208 that facilitates the redemption of the value added services. The at least one memory and the computer program code are further configured to, with the at least one processor, establish, through the bridging application 1206, communication between the processing application and the plurality of redemption applications 1204 to transmit and receive the data 1208 that facilitates the redemption of the value added services, wherein the data 1208 is transmitted and received through the set of commands instituted by the bridging application to standardise communication between the plurality of redemption applications 1204 and the processing application 1206.

In the implementation shown in FIG. 13, the communication hardware of the RF processor 1312, the antenna 1310 and the baseband processor 1314 detects for the presence of the bridging application 1206 installed in the mobile terminal 210. In response to successful detection of the presence of the bridging application 1206, this communication hardware will then establish the communication between the processing application hosted in the receiving terminal 214 and the plurality of redemption applications 1204 at the mobile terminal 210, through the bridging application 1206.

The at least one processor may be further configured to access a library when the processing application communicates with the bridging application 1206. This library comprises a repository of commands compatible with the set of commands of the processing application, so as to provide the at least one processor with the necessary commands that allow communication between the receiving terminal 214 and the mobile terminal 210. This library may exist in a kernel of the at least one memory. Alternatively, this library may be stored in the system partition 1332.

The VAS kernel is an additional software component residing on the receiving terminal 214 that facilitates the NFC process with the bridging application 1206 installed in the mobile terminal 210. With the VAS Kernel deployed into the receiving terminal 214, it will interface with the bridging application 1206 within the mobile terminal 210 to retrieve and process data that facilitates the value added services redemption such as: loyalty ID, coupons, the unique identifier of FIGS. 2 to 6 and other data shared through the Select Application, Exchange Data and Update Coupon Status commands (see FIGS. 14 and 15 described below).

The receiving terminal 214 may be configurable to support a "One-Tap" or "Two-Tap" process in redeeming value added services and completing final payment.

In the "One-Tap" process, the VAS kernel is configured to handle the processes associated with the redemption of value added services and the retrieved data is processed locally (i.e. without the need to communicate to a separate coupon and loyalty system). The calculation of a balance of the value added service being redeemed (such as loyalty points) will be updated and the mobile terminal 210 continues to execute the final payment process. This is required to allow the receiving terminal 214 to update the total payment amount following the redemption of any value added service and request payment within the time allowed for a single tap transaction to take place, which is expected to be a maximum of 0.5 seconds. In this "One-Tap" process, there is an uninterrupted data communication sequence between the mobile terminal 210 and the receiving terminal 214. During this uninterrupted data communication sequence, there is exchange of data that facilitates the redemption of the value added services and the payment of purchased goods and/or services from the point of initiation for both to the point of completion for both.

The "Two-Tap" process applies if the VAS kernel is not configured to support local processing of the retrieved data or the data cannot be locally processed. The VAS kernel will act as a pass-through to send the data to, for example a POS terminal 214a if the receiving terminal 214 is a payment terminal 214b (see FIGS. 7 to 9), for further processing of final transaction total. In this "Two-Tap" process, there may be a first data communication sequence between the mobile terminal 210 and the receiving terminal 214. During this first data communication sequence, there is exchange of data that facilitates the redemption of the value added services from the point of initiation to the point of completion. A second data communication sequence between the mobile terminal 210 and the receiving terminal 214 may then follow the first data communication sequence. The second data communication sequence is separate to the first data communication sequence, wherein the first data communication sequence and the second data communication sequence are a time interval apart. During this second data communication sequence, there is exchange of data that facilitates the payment of purchased goods and/or services from the point of initiation to the point of completion. The first data communication sequence may be initiated by one of the plurality of redemption applications 1204, while the second data communication sequence may be initiated by the digital wallet application 210d (see FIGS. 7 to 9). Thus the "Two-Tap" process uses two separate and distinct data communication sequences for the redemption of value added services and payment of purchased goods and/or services, in contrast to the uninterrupted data communication sequence used in the "One-Tap" process.

The receiving terminal 214 of FIG. 13 is configured to redeem value added services transmitted by the mobile terminal 210 when the receiving terminal 214 executes instructions which may be stored in any one or more of the RAM 1326 or the long-term storage 1328. These components 1326 and 1328 provide a non-transitory computer readable medium having stored thereon executable instructions to have the receiving terminal 214 host a processing application configured to redeem value added services, the processing application controlling the receiving terminal to perform steps comprising: a) detecting for the presence of the bridging application 1206 installed in the mobile terminal 210 at which is installed the plurality of redemption applications 1204 configured to facilitate the redemption of the value added services, the bridging application 1206 instituting a set of commands used by the plurality of redemption applications 1204 and the processing application to transmit and receive data 1208 that facilitates the redemption of the value added services; and b) establishing, through the bridging application 1206, communication between the processing application and the plurality of redemption applications 1204 to transmit and receive the data 1208 that facilitates the redemption of the value added services, wherein the data is transmitted and received through the set of commands instituted by the bridging application 1206 to standardise communication between the plurality of redemption applications 1204 and the processing application.

Figure 14:
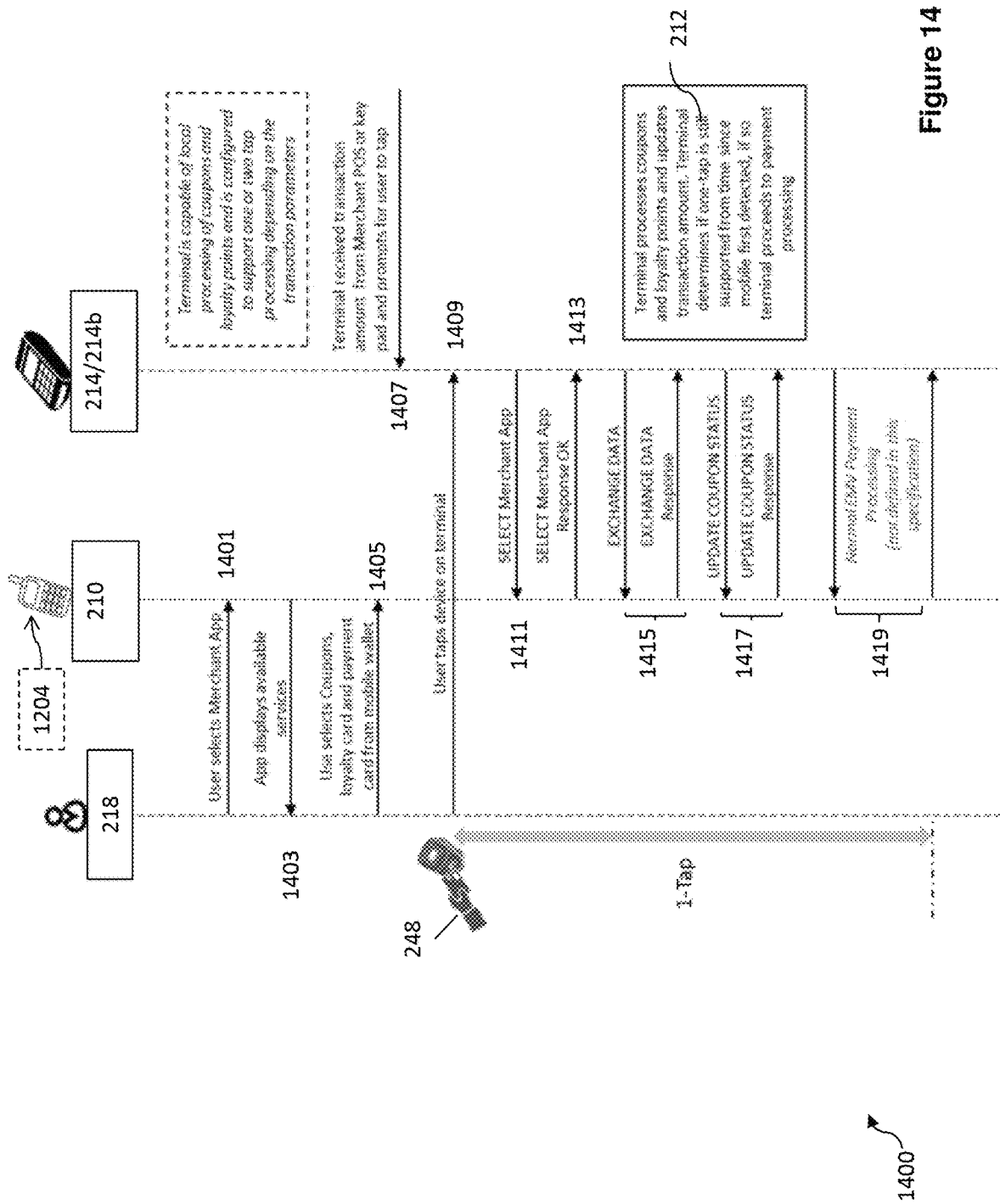
FIG. 14 shows the flow of command exchanges in accordance with implementing a "One-Tap" process for the architecture shown in FIG. 12.

FIG. 14 shows the flow 1400 of command exchanges in accordance with implementing a "One-Tap" process for the architecture shown in FIG. 12. The components involved in FIG. 14 are the same as those described with respect to FIGS. 2 to 5, i.e. a mobile terminal 210 (operated by a user 218) and a receiving terminal 214. A server 212, that administers a communication link 216 over which transaction data is transmitted between the mobile terminal 210 and the receiving terminal 214, is schematically shown next to the portion of the flow 1400 where there is interaction with the server 212. Further, the flow 1400 may require only the payment terminal 214b (see FIGS. 7 to 9) of the receiving terminal 214.

In step 1401, the user 218 selects a merchant application or redemption application 1204 which is able to redeem the desired value added service. The selected redemption application 1204 then returns 1403 a list of available options that initiates the redemption of the selected value added service. These options include a list of coupons, offers and loyalty program points that when selected may, for example, provide a discount on a good that is to be purchased. After the user 218 has selected 1405 the desired value added service for redemption, the redemption application 1204 is then ready to communicate with the receiving terminal 214.

In the implementation shown in FIG. 14, the receiving terminal 214 indicates 1407 its readiness to process data transmitted by the mobile terminal 210 by having received data on the transaction amount and prompting the user 218 to tap or place the mobile terminal 210 in proximity to the receiving terminal 214. Communication between the receiving terminal 214 and the mobile terminal 210 may be via a NFC protocol 248. After the user 218 taps 1409 the mobile terminal 210 to the receiving terminal 214, the receiving terminal 214 then executes a "Select Application" command, where the receiving terminal 214 detects 1411 for the operation of the selected redemption application 1204. The mobile terminal 210 then responds 1413 to the receiving terminal 214 upon confirmation that handshaking has occurred between the receiving terminal 214 and the mobile terminal 210, which establishes a communication channel between the two devices.

In step 1415, an "Exchange Data" command is executed over the communication channel established in the step 1413, where data is exchanged between the receiving terminal 214 and the mobile terminal 210 that facilitates the redemption of the value added services. As described above with reference to FIG. 12, the redemption of the value added services is facilitated by the bridging application 1206 hosted in the mobile terminal 210 and the VAS kernel accessed by the processing application hosted in the receiving terminal 214. After this exchange of data, an "Update Coupon Status" command is executed in step 1417 over the communication channel established in the step 1413, where data is exchanged between the receiving terminal 214 and the mobile terminal 210 that updates records stored in either or both of the receiving terminal 214 and the mobile terminal 210, these records being related to the management of the value added services, such as updating a balance of a loyalty account or that a limited use coupon has been fully redeemed and is thus no longer available.

The completion of step 1417 marks the completion of the data exchange between the receiving terminal 214 and the mobile terminal 210 in respect of redemption of value added services. Data exchange which facilitates payment of the purchased goods and/or services then occurs in step 1419, where this payment is made possible through a digital wallet application 210d (see FIGS. 7 to 9) installed in the mobile terminal 210.

Figure 15:
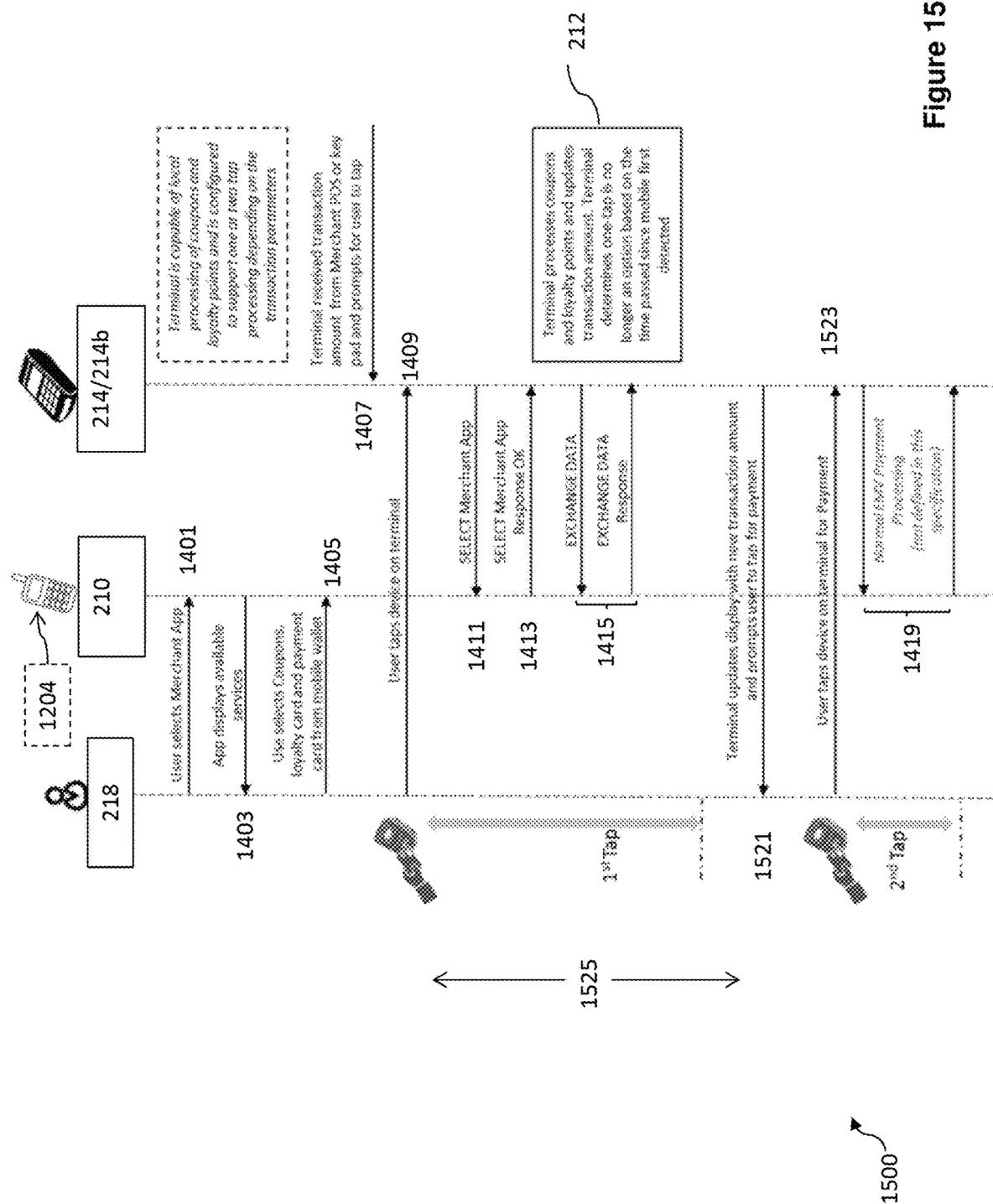
FIG. 15 shows the flow of command exchanges in accordance with implementing a "Two-Tap" process for the architecture shown in FIG. 12.

FIG. 15 shows the flow 1500 of command exchanges in accordance with implementing a "Two-Tap" process for the architecture shown in FIG. 12. As in FIG. 14, the components involved in FIG. 15 are the same as those described with respect to FIGS. 2 to 5, i.e. a mobile terminal 210 (operated by a user 218) and a receiving terminal 214. A server 212, that administers a communication link 216 over which transaction data is transmitted between the mobile terminal 210 and the receiving terminal 214, is schematically shown next to the portion of the flow 1500 where there is interaction with the server 212. Further, the flow 1500 may require only the payment terminal 214b (see FIGS. 7 to 9) of the receiving terminal 214. The differences between the process flow 1500 of FIG. 15 and the process flow 1400 of FIG. 14 are described below.

In the "Two-Tap" process of FIG. 15, there is no execution of an "Update Coupon Status" command. At the end of step 1415, an updated transaction amount (which results from the redemption of the value added service on the original transaction cost) is displayed 1521 to the user 218, along with a prompt for the user 218 to tap the mobile terminal 210 against the receiving terminal 214 so as to proceed with payment of the updated transaction amount. The user 218 may then initiate a digital wallet application 210*d* (see FIGS. 7 to 9) to make this payment, wherein the initiation of this digital wallet application 210*d* is detected at step 1523 when the mobile terminal 210 is tapped against the receiving terminal 214. Data sent by the receiving terminal 214, which facilitates payment of the purchased goods and/or services, is then exchanged between the receiving terminal 214 and the mobile terminal 210.

The "Two-Tap" process 1500 of FIG. 15 may be initiated in response to the receiving terminal 214 detecting that time interval 1525 is too long for implementation of the "One-Tap" process 1400 of FIG. 14 to be feasible. However the "Two-Tap" process may also be employed if the receiving terminal 214 is not configured to be able to perform the "One-Tap" process 1400 of FIG. 14.

Figure 16:
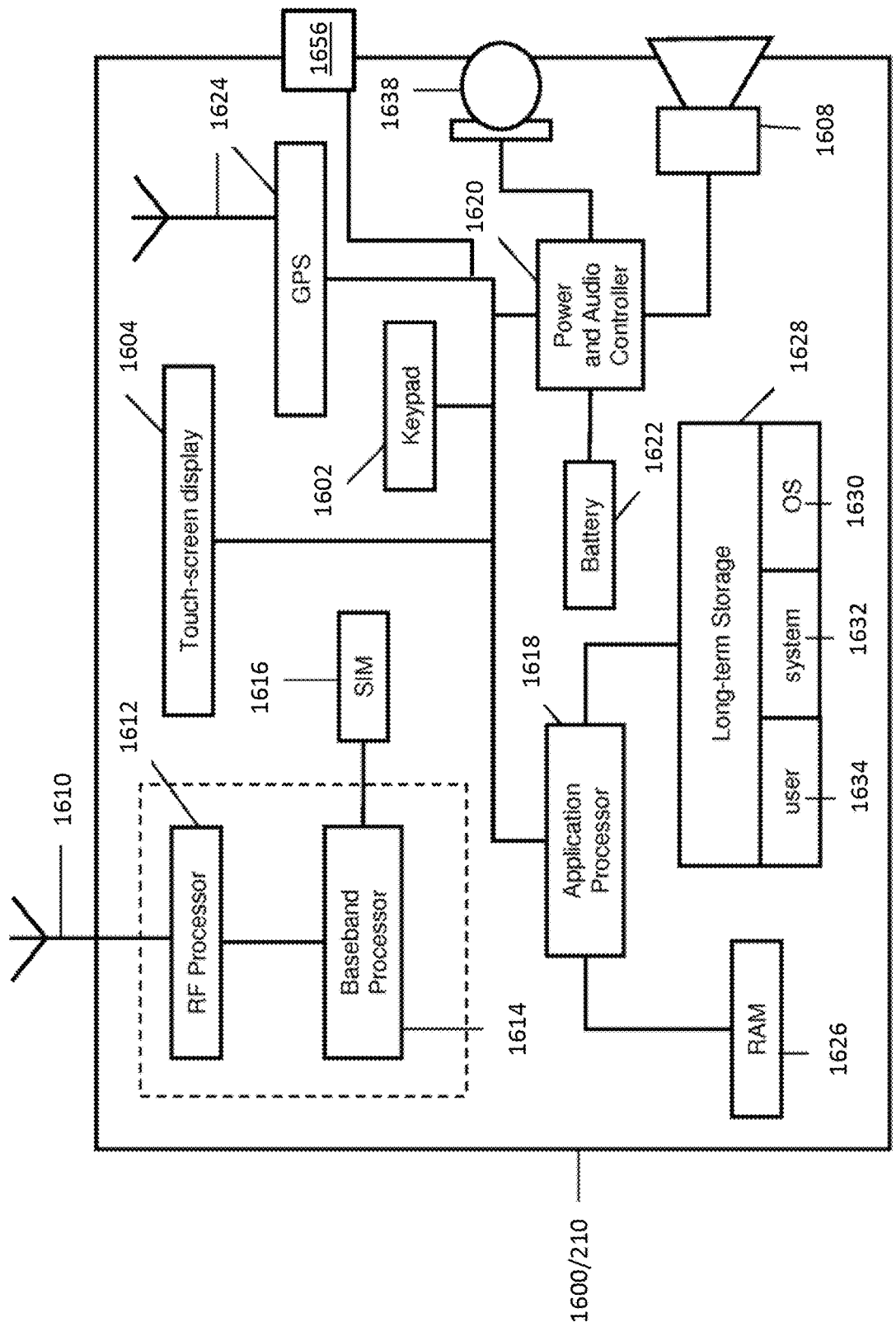
FIG. 16 is a schematic of a wireless device used to implement the mobile terminal shown in FIGS. 2 to 10 and 12.

FIG. 16 is a schematic of a wireless device 1600 that may be utilized to implement the mobile terminal 210 shown in FIGS. 2 to 10 and 12. The wireless device 1600 may be in communication (e.g. through NFC or via a QR code) with the receiving terminal 214.

The wireless device 1600 comprises a keypad 1602, a touch-screen 1604, a microphone 1638, a speaker 1608 and an antenna 1610. The wireless device 1600 is capable of being operated by a user to perform a variety of different functions, such as, for example, hosting a telephone call, sending an SMS message, browsing the Internet, sending an email and providing satellite navigation.

The wireless device 1600 comprises hardware to perform communication functions (e.g. telephony, data communication), together with an application processor and corresponding support hardware to enable the wireless device have other functions, such as, messaging, Internet browsing, email functions and the like. The communication hardware is represented by the RF processor 1612 which provides an RF signal to the antenna 1610 for the transmission of data signals, and the receipt therefrom. Additionally provided is a baseband processor 1614, which provides signals to and receives signals from the RF Processor 1612. The baseband processor 1614 also interacts with a subscriber identity module 1616, as is well known in the art. The communication subsystem enables the wireless device 1600 to communicate via a number of different communication protocols including 3G, 4G, GSM, WiFi, Wi-fi direct, Near Field Communication (NFC), Bluetooth™ and/or CDMA.

The keypad 1602 and the touch-screen 1604 are controlled by an application processor 1618. A power and audio controller 1620 is provided to supply power from a battery 1622 to the communication subsystem, the application processor 1618, and the other hardware. The power and audio controller 1620 also controls input from the microphone 1638, and audio output via the speaker 1608. Also provided is a global positioning system (GPS) antenna and associated receiver element 1624 which is controlled by the application processor 1618 and is capable of receiving a GPS signal for use with a satellite navigation functionality of the wireless device 1600.

In order for the application processor 1618 to operate, various different types of memory are provided. Firstly, the wireless device 1600 includes Random Access Memory (RAM) 1626 connected to the application processor 1618 into which data and program code can be written and read from at will. Code placed anywhere in RAM 1626 can be executed by the application processor 1618 from the RAM 1626. RAM 1626 represents a volatile memory of the wireless device 1600.

Secondly, the wireless device 1600 is provided with a long-term storage 1628 connected to the application processor 1618. The long-term storage 1628 comprises three partitions, an operating system (OS) partition 1630, a system partition 1632 and a user partition 1634. The long-term storage 1628 represents a non-volatile memory of the wireless device 1600.

In the present example, the OS partition 1630 contains the firmware of the wireless device 1600 which includes an operating system. Other computer programs may also be stored on the long-term storage 1628, such as application programs, and the like. In particular, application programs which are mandatory to the wireless device 1600, such as, in the case of a smartphone, communications applications and the like are typically stored in the system partition 1632. The application programs stored on the system partition 1632 would typically be those which are bundled with the wireless device 1600 by the device manufacturer when the wireless device 1600 is first sold. Application programs which are added to the wireless device 1600 by the user would usually be stored in the user partition 1634.

As stated, the representation of FIG. 16 is schematic. In practice, the various functional components illustrated may be substituted into one and the same component. For example, the long-term storage 1628 may comprise NAND flash, NOR flash, a hard disk drive or a combination of these.

The wireless device 1600 may also have an image capturing module 1656. The image capturing module, together with a suitable application, may be used to capture/scan QR codes and process the data embedded in the QR code.

With reference to FIG. 12, the mobile terminal 210 can have installed the plurality of redemption applications 1204 configured to facilitate the redemption of the value added services. To facilitate this redemption of value added services, the at least one processor (e.g. application processor 1618) and the at least one memory (e.g. RAM 1626, long-term storage 1628) with its computer program code are configured to cause the mobile terminal 210 at least to detect for the presence of the processing application hosted in the receiving terminal 214, the processing application configured to redeem the value added services transmitted by the mobile terminal 210. The at least one memory and the computer program code are further configured to, with the at least one processor, activate, at the mobile terminal 210, the bridging application 1206 instituting a set of commands used by the plurality of redemption applications 1204 and the processing application to transmit and receive the data 1208 that facilitates the redemption of the value added services. The at least one memory and the computer program code are further configured to, with the at least one processor, to establish, through the bridging application 1206, communication between the processing application and the plurality of redemption applications 1204 to transmit and receive the data 1208 that facilitates the redemption of the value added services, wherein the data 1208 is transmitted and received through the set of commands instituted by the bridging application 1206 to standardise communication between the plurality of redemption applications 1204 and the processing application.

FIG. 17 shows a schematic of a data packet 1700 that results from performing authentication of the mobile terminal 210 (see FIGS. 2 to 5) before exchange of transaction data relating to the redemption of value added services. The authentication code that the receiving terminal 214 receives from the mobile terminal 210 is represented using reference numeral 1702, while the authentication code generated by the receiving terminal 214 is represented using reference numeral 1704. Computation of the match between the authentication code 1702 received from the mobile terminal 210 and the authentication code 1704 generated by the receiving terminal 214 may be performed using a 3DES algorithm in CBC (cyclic block chaining mode) mode. In FIG. 17, this 3DES algorithm is based on ISO/IEC 9797-1 Algorithm 3, which follows a sequence 1706 of data transformations shown in FIG. 17, wherein the implementation of this sequence 1706 is appreciated by those skilled in the art. The sequence 1706 may begin with an initial vector 1708 of 8 bytes of all zeros while the computation results in a secret key 1710 of 16 bytes that is shared between the VAS kernel in the receiving terminal 214 and the plurality of redemption applications 1204 hosted in the mobile terminal 210.

Figure 18:
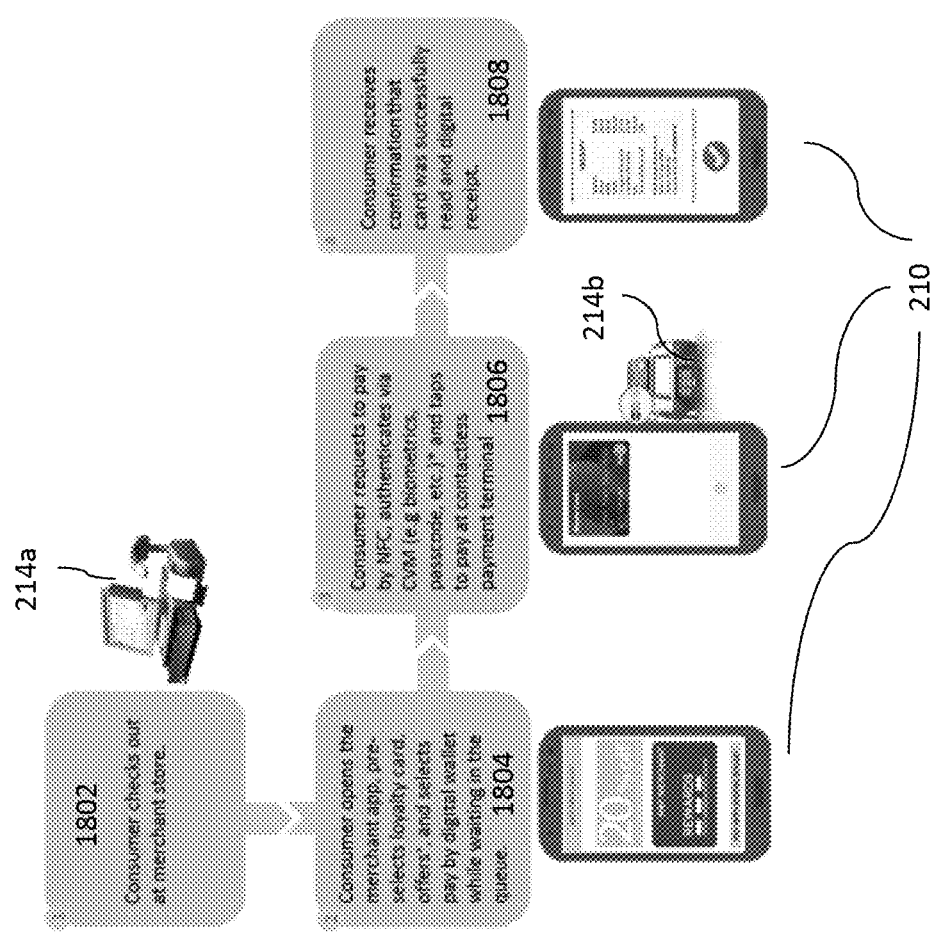
FIG. 18 illustrates an overview of the "One-Tap" experience shown in FIG. 14.

FIG. 18 illustrates an overview of the "One-Tap" experience shown in FIG. 14.

At step 1802, a customer checks out at a POS terminal 214a. At step 1804, while waiting in the queue, the customer can open a merchant application installed in a mobile terminal 210 to preselect a loyalty card or offer that is used to redeem a desired value added service. The customer can also select a payment card registered in a digital wallet application in the mobile terminal 210 to make payment. At step 1806, the customer then taps the mobile terminal 210 against the receiving terminal 214 to redeem the selected value added service and make payment. In step 1808, the mobile terminal 210 receives confirmation of successful redemption of the value added service and a digital receipt of the payment made using the digital wallet application.

Figure 19:
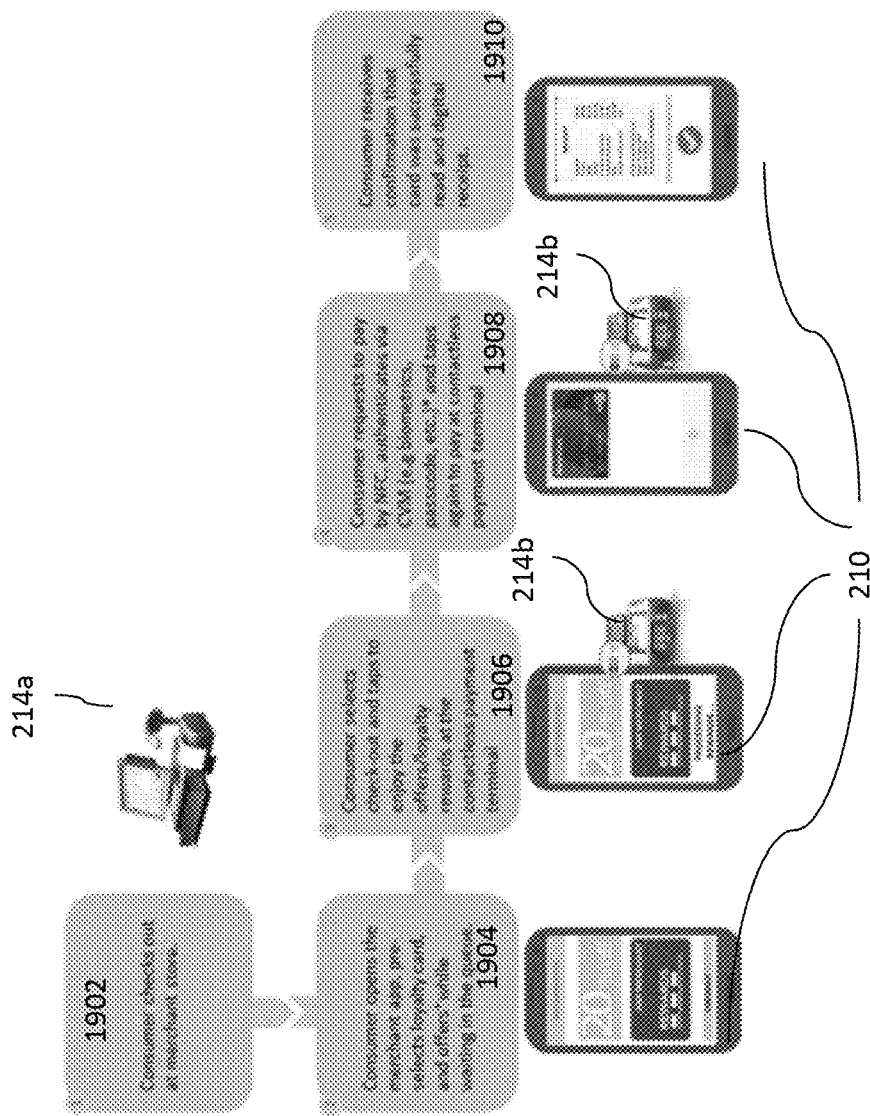
FIG. 19 illustrates an overview of the "Two-Tap" experience shown in FIG. 15.

FIG. 19 illustrates an overview of the "Two-Tap" experience shown in FIG. 15.

At step 1902, a customer checks out at a POS terminal 214a. At step 1904, while waiting in the queue, the customer can open a merchant application installed in a mobile terminal 210 to preselect a loyalty card or offer that is used to redeem a desired value added service. At step 1906, the customer performs a first tap of the mobile terminal 210 against the receiving terminal 214 to redeem the selected value added service. In step 1908, the mobile terminal 210 receives confirmation of successful redemption of the value added service. The customer then selects a payment card registered in a digital wallet application in the mobile terminal 210 and performs a second tap of the mobile terminal 210 to make payment. In step 1910, the mobile terminal 210 receives a digital receipt of the payment made using the digital wallet application.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for enabling a communication link between a mobile terminal and a receiving terminal over which transaction data associated with a transaction is transmitted, the method comprising:
   generating, by one of the mobile terminal, the receiving terminal and a server, a unique identifier;
   storing, in a memory, at each of (i) the mobile terminal, (ii) the receiving terminal and (iii) a server administering the communication link, the unique identifier;
   creating a storage slot at the server administering the communication link, wherein the storage slot is assigned the unique identifier, stores at least a portion of the transaction data, and indicates that a channel is allocated for the communication link between the mobile terminal and the receiving terminal;
   in response to the creation of the storage slot, enabling, by the server, communication via the channel allocated for the communication link, of the transaction data between the mobile terminal and the receiving terminal, wherein the communication channel is located and subsequently utilised by both the mobile terminal and the receiving terminal by referencing the unique identifier to the server,
   upon completion of the transaction, deleting, by the server, the storage slot, and
   transmitting, by the server, to the receiving device, a message indicating that the storage slot has been deleted.

2. The method of claim 1, further comprising
   retrieving, at the mobile terminal, an authentication code stored in the storage slot of the server;
   receiving, at the receiving terminal, the authentication code from the mobile terminal;
   comparing the received authentication code against an authentication code generated by the receiving terminal; and
   authenticating the mobile terminal in response to confirmation of a match between the received authentication code and the generated authentication code.

3. The method of claim 2, wherein the authentication code is stored in the storage slot in response to the receiving terminal transmitting the authentication code, stored in the receiving terminal, to the server.

4. The method of claim 2, wherein the authentication code is generated in the receiving terminal using an encryption key kept in the receiving terminal.

5. The method according to claim 2, wherein the authentication of the mobile terminal is for exchange of transaction data relating to redemption of value added services.

6. The method according to claim 5, wherein the value added services comprise any one or more of coupons, offers and loyalty program points.

7. The method of claim 1, wherein the storage slot is created in response to being prompted by the receiving terminal after the receiving terminal receives the unique identifier.

8. The method of claim 1, wherein the mobile terminal receives the unique identifier before the storage slot is created at the server.

9. The method of claim 1, wherein the receiving terminal receives the unique identifier before the storage slot is created at the server.

10. The method of claim 1, wherein the mobile terminal generates the unique identifier and transmits the unique identifier to the receiving terminal.

11. The method of claim 10, wherein the unique identifier is transmitted between the receiving terminal and the mobile terminal using a NFC protocol or a QR code.

12. The method of claim 1, wherein the receiving terminal generates the unique identifier and transmits the unique identifier to the mobile terminal.

13. The method of claim 1, wherein the server generates the unique identifier and transmits the unique identifier to the receiving terminal, from which the mobile terminal receives the unique identifier.

14. The method of claim 13, further comprising
receiving, at the receiving terminal or the mobile terminal, an indication of the utilisation of the communication link to facilitate payment of goods and/or services upon which the transaction data is based, wherein the indication is provided in the QR code.

15. The method of claim 14, wherein the receiving terminal receives the indication from the QR code transmitted by the mobile terminal.

16. The method of claim 14, wherein the mobile terminal receives the indication from the QR code transmitted by the receiving terminal.

17. The method of claim 1, wherein the unique identifier is generated in response to the mobile terminal providing an indication of requiring the enablement of the communication link.

18. The method of claim 1, wherein the transaction data comprises data generated during a transaction for purchase of goods and/or services, wherein the generated data comprises any one or more of payment details of the transaction; a receipt of the cost of the transaction and details of the purchased goods and/or services; and data used to facilitate redemption of value added services.

19. The method of claim 18, further comprising
receiving, in the mobile terminal, the receipt in response to the mobile terminal requesting for the receipt using the unique identifier.

20. The method of claim 18, further comprising
synchronizing a balance of a loyalty account in response to an exchange, between the mobile terminal and the receiving terminal, of the data used to facilitate the redemption of the value added services, so as to update the loyalty account due to the redemption of the value added services, wherein the loyalty account is stored in the mobile terminal and the receiving terminal.

21. A server for enabling a communication link over which transaction data, associated with a transaction, is transmitted between a mobile terminal and a receiving terminal the server comprising:
a processor; and
a memory including computer program code;
the computer program code when executed by the processor causes the processor to:
generate a unique identifier;
store, in the memory, the unique identifier;
create a storage slot for administering the communication link, wherein the storage slot is assigned the unique identifier, is used to store the transaction data and the unique identifier, and indicates that a channel is allocated for the communication link between the mobile terminal and the receiving terminal;
enable, in response to the creation of the storage slot, communication via the channel allocated for the communication link of the transaction data between the mobile terminal and the receiving terminal, wherein the communication channel is configured to be located and subsequently utilized by both the mobile terminal and the receiving terminal by referencing the unique identifier to the server;
delete, upon completion of the transaction using the transaction data, the storage slot; and
transmit, to the receiving device, a message indicating that the storage slot has been deleted.

22. The server of claim 21, wherein the processor of the server generates the unique identifier in response to a prompt received from the receiving terminal.

23. A receiving terminal configured to utilise a communication link, administered by a server, over which transaction data, associated with a transaction, is transmitted between a mobile terminal and the receiving terminal, the receiving terminal comprising:
a processor; and
a memory including computer program code;
the computer program code when executed by the processor causes the processor to:
generate a unique identifier;
store, in the memory, the generated unique identifier used to facilitate the enablement of the communication link;
detect, using the unique identifier, the presence of a storage slot at the server administering the communication link, wherein the storage slot is assigned the unique identifier, is configured to store the transaction data and the unique identifier, and indicates that a channel is allocated for the communication link between the mobile terminal and the receiving terminal;
access the communication link, as enabled by the server in response to the creation of the storage slot, and transmit, via the channel allocated for the communication link, the transaction data between the mobile terminal and the receiving terminal, wherein the communication channel is located and utilized by both the mobile terminal and the receiving terminal by referencing the unique identifier to the server;
upon completion of the transaction using the transaction data, send a request to the server to delete the storage slot; and
receive, from the server, a message indicating that the storage slot has been deleted.

\* \* \* \* \*